(12) United States Patent
Marti Sanroma et al.

(10) Patent No.: US 11,412,738 B2
(45) Date of Patent: Aug. 16, 2022

(54) PHYLLOSILICATE-COPPER SOLID MATERIALS WITH BIOCIDAL ACTIVITY

(71) Applicant: LABORATORIO JAER, S.A., Sant Vicenc dels Horts (ES)

(72) Inventors: Gabriel Marti Sanroma, Sant Vicenc dels Horts (ES); Sergio De Cozar Garcia, Sant Vicenc dels Horts (ES)

(73) Assignee: LABORATORIO JAER, S.A., San Vicenc dels Horts (ES)

( * ) Notice: Subject to any disclaimer, the term of this patent is extended or adjusted under 35 U.S.C. 154(b) by 0 days.

(21) Appl. No.: 16/490,431

(22) PCT Filed: Mar. 2, 2018

(86) PCT No.: PCT/ES2018/070158
§ 371 (c)(1),
(2) Date: Aug. 30, 2019

(87) PCT Pub. No.: WO2018/158486
PCT Pub. Date: Sep. 7, 2018

(65) Prior Publication Data
US 2020/0060282 A1    Feb. 27, 2020

(30) Foreign Application Priority Data
Mar. 3, 2017 (EP) .................................. 17159035

(51) Int. Cl.
*A01N 59/20* (2006.01)
*A01N 59/16* (2006.01)
(52) U.S. Cl.
CPC .............. *A01N 59/20* (2013.01); *A01N 59/16* (2013.01)
(58) Field of Classification Search
None
See application file for complete search history.

(56) References Cited

U.S. PATENT DOCUMENTS

| 6,054,052 A | 4/2000 | Dhingra et al. |
| 2009/0149592 A1 | 6/2009 | Lin et al. |
| 2013/0084339 A1 | 4/2013 | Cabal et al. |
| 2013/0108702 A1 | 5/2013 | Santra |
| 2015/0098974 A1 | 4/2015 | Santra et al. |

FOREIGN PATENT DOCUMENTS

CN    104277680 A    1/2015

OTHER PUBLICATIONS

Christy et al. "A novel combustion method to prepare CuO nanorods and its antimicrobial and photocatalytic activities", Powder Technology, 235, 2013, pp. 783-786. (Year: 2013).*
Motshekga et al., "Microwave-assisted synthesis, characterization and antibacterial activity of Ag/ZnO nanoparticles supported bentonite clay", Journal of Hazardous Materials, 262, (2013), pp. 439-446. (Year: 2013).*
Xu et al., "Single-Crystal Metal Nanoplatelets: Cobalt, Nickel, Copper, and Silver", Crystal Growth & Design 2007, 7(9), pp. 1904-1911. (Year: 2007).*
International Search Report dated Jun. 14, 2018 in PCT/ES2018/070158 filed on Mar. 2, 2018.
Lima, E. et al. "Gold nanoparticles as efficient antimicrobial agents for *Escherichia coli* and *Salmonella typhi*" Chemistry Central Journal, 2013, 7 pages.
Rai, M. et al. "Silver nanoparticles as a new generation of antimicrobials" Biotechnology Advances, 2009, pp. 76-83.
Borkow, G. "Using Copper to Fight Microorganisms" Current Chemical Biology, vol. 6, No. 2, 2012, pp. 93-103.
Nair, R. et al. "Nanoparticulate material delivery to plants" Plant Science, 2010, pp. 154-163.
Gupta, A.K. et al. "Synthesis and surface engineering of iron oxide nanoparticles for biomedical applications" Biomaterials, 2005, pp. 3995-4021.
Scheck, H.J. et al. "Effect of Copper Bactericides on Copper-Resistant and -Sensitive Strains of *Pseudomonas syringae* pv. *syringae*" Plant Disease, 1998, pp. 397-406.

* cited by examiner

*Primary Examiner* — Melissa L Fisher
(74) *Attorney, Agent, or Firm* — Oblon, McClelland, Maier & Neustadt, L.L.P.

(57) ABSTRACT

The invention relates to the production of a solid material comprising a phyllosilicate onto which Cu(0) nanoparticles have been deposited. The solid can be used in several biological applications, primarily in agriculture for crop control. The invention also provides a method for manufacturing the solid, which comprises delaminating the phyllosilicate and depositing Cu(0) nanoparticles onto the delaminated phyllosilicate.

20 Claims, 4 Drawing Sheets

PHYLLOSILICATE-COPPER SOLID MATERIALS WITH BIOCIDAL ACTIVITY

FIELD OF THE ART

The present invention relates to solids comprising Cu(0) nanoparticles deposited on a phyllosilicate, and to a method of manufacture of said solids. The solids of the invention are particularly useful as biocidal agents.

BACKGROUND OF THE INVENTION

The use of broad-spectrum biocidal agents which allow acting selectively and effectively on pathogenic microorganisms which generally affect plants and crops, food or fodder products and also water or textiles, is a subject of continuous and increasing industrial interest. The development of new biocidal agents seeks not only an increase in their activity and effectiveness, but also aims at reducing their polluting impact on the environment, as well as their toxic or harmful effect on human beings and animals.

In recent years, various laboratory- and industrial-scale formulations with proven biocidal effects have been developed based on noble metals, such as Au [E. Lima et al., *Chemistry Central Journal*, 7 (2013) 11] and Ag [M. Rai, A. Yadav, A. Gade, *Biotechnology Advances*, 27 (2009) 76], and also transition metals, for example Cu [G. Borkow, *Current Chemical Biology*, 6(2) (2012) 93], Zn [R. Nair, S. H. Varghese, B. G. Nair, T. Maekawa, Y. Yoshida, D. S. Kumar, *Plant Science*, 179 (2010) 154] or Fe [A. K. Gupta, M. Gupta, *Biomaterials*, 26 (2005), 3995]. The biocidal action exerted by the metallic species of Ag(0), generally in the form of nanoparticles homogeneously distributed in different types of solid dispersing agents or supports, such as silica or even polymeric matrices (cross-linked polymers), is well known. In this regard, the use of Ag nanoparticles highly dispersed in kaolin compounds has been recently reported, these materials having antimicrobial activity and this activity being increased by reducing the size of the metallic nanoparticles [M. B. Cabal, J. S. Moya Corral, US 20130084339 (2013)].

In the case of Cu, the biocidal action of different types of cationic Cu compounds, such as Cu(II) hydroxide [Cu(OH)$_2$], Cu(II) oxychloride [Cu$_2$(OH)$_3$Cl], tribasic Cu(II) sulfate [Cu$_3$(OH)$_2$.CuSO$_4$], and also Cu(I) oxide [Cu$_2$O], is well known; these compounds are used in different commercial formulations for pest treatment in horticultural crops, vine, fruit cultivation, or even in ornamental plants [H. J. Scheck, J. W. Pscheidt, *Plant Disease*, 82(4) (1998) 397]. However, there is a health- and environment-related need to reduce the amounts of Cu to be applied per hectare, so formulations that are more effective than those available today are required.

Dispersion of Cu compounds on inorganic supports is also reported in the art [S. Santra, US 20130108702 A1 (2013)], although biocidal activity results achieved up until now are rather inconsistent. Supports have also so far been employed which have all their dimensions in nano size. However, by having all their dimensions in nano size, the nanoparticular supports provide a large surface area onto which the copper is deposited, and ultimately an excessively high amount of Cu comes into contact with the plant, leading to phytotoxicity. In other words, instead of protecting the plants, the Cu/support nanoparticles attack the plants and cause considerable damage. Additionally, the nanoparticles can enter the lungs of human beings and/or animals and cause serious health problems, since they can reach very deep areas.

Therefore, there is a need to provide new copper-based agents which allow making use of the good biocidal properties of copper in an effective yet safer manner. Additionally, said agents should from the industrial point of view be easy to manufacture.

SUMMARY OF THE INVENTION

The present inventors have now surprisingly found that depositing Cu(0) nanoparticles on phyllosilicates with a nanometric dimension and remaining dimensions of micrometric size provides solids which are effective as biocidal agents yet safer than compositions wherein the biocidal metal particles are applied as nanoparticles, including compositions wherein the nanoparticles are deposited on an inorganic support which is nanometric in all of its dimensions.

Advantageously, said solids have an effectiveness comparable or superior to that of conventional commercial formulations while using much less copper at the same time. Additionally, another significant advantage lies in the low phytotoxicity of the formulation, given that the amount of metal which is in contact with the surface of the plant is very little compared to a conventional nanoparticle formulation, where all the metal present would be in contact with the plant.

Thus, in a first aspect, the present invention is directed to a solid comprising Cu(0) nanoparticles deposited on a phyllosilicate, wherein the size of one of the dimensions of the solid is nanometric, and the size of the other two dimensions of the solid is micrometric.

The present inventors have also found that the solids of the invention can be prepared in a simple and cost-effective manner with a high yield.

Another aspect of the present invention therefore relates to a method for manufacturing the solid of the invention, which comprises delaminating a phyllosilicate and then depositing Cu(0) nanoparticles on the delaminated phyllosilicate.

In a third aspect, the present invention is directed to the use of the solid of the invention as a biocidal agent. This use can be for crop protection in agriculture; for the protection and preservation of plant seeds; for the preservation of food products, in particular fruits and vegetables; for the preservation of fodder; for the treatment or quality maintenance of water; for the preparation of biocidal paints; or for the treatment of textiles.

BRIEF DESCRIPTION OF THE DRAWINGS

3A shows the micrograph of the calcined Cu/kaolin material (Example 1, T1); FIG. 3B shows the micrograph of the reduced Cu/kaolin material (Example 2, T2).

FIG. 4A shows the micrograph of the calcined Cu—Zn/kaolin material (Example 4, T4); FIG. 4B shows the micrograph of the reduced Cu—Zn/kaolin material (Example 5, T5).

DETAILED DESCRIPTION OF THE INVENTION

Figure 1:
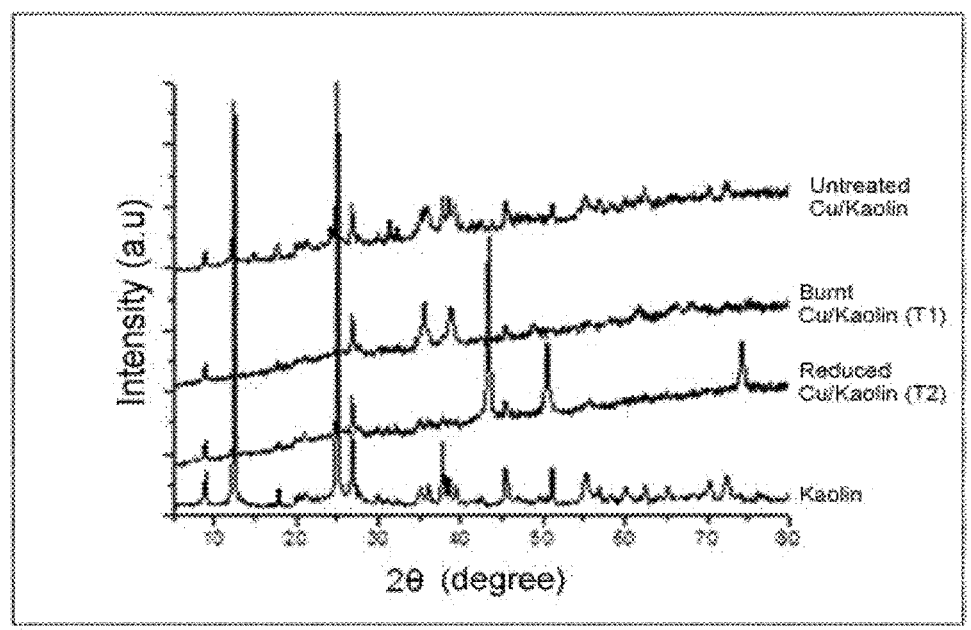
FIG. 1 shows a comparative graph of the X-ray diffractograms obtained for Cu/kaolin materials of Examples 1 and 2, comparing the X-ray diffraction profiles of the starting support (kaolin), the treatment-free Cu/kaolin synthesis material (without calcining), the calcined Cu/kaolin material (Example 1, T1) and the reduced Cu/kaolin material (Example 2, T2).
Figure 2:
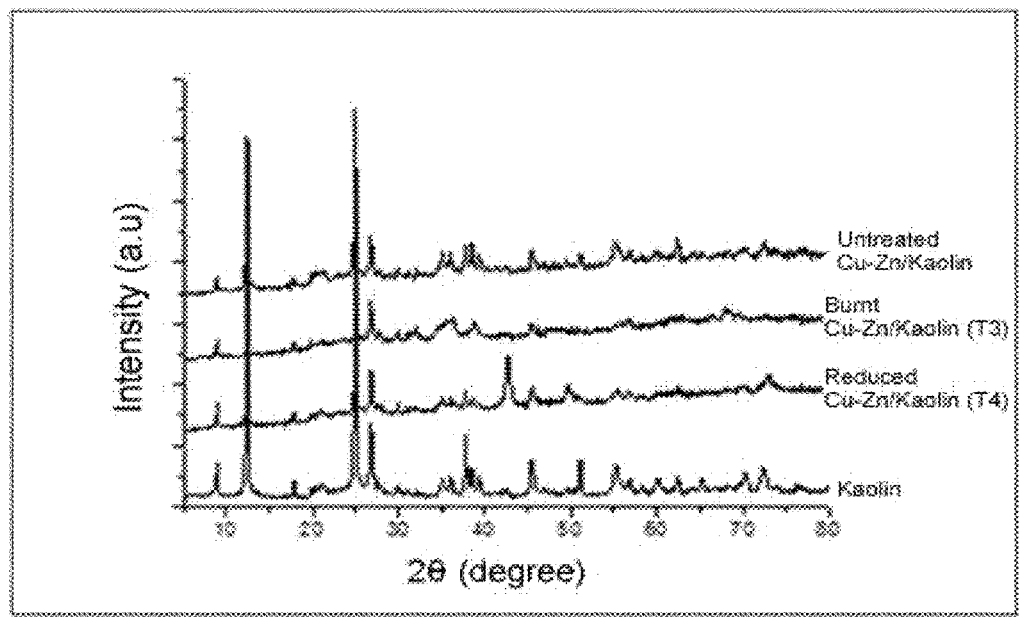
FIG. 2 shows a comparative graph of the X-ray diffractograms obtained for Cu—Zn/kaolin materials of Examples 3 and 4, comparing the X-ray diffraction profiles of the starting support (kaolin), the treatment-free Cu—Zn/kaolin synthesis material (without calcining), the calcined Cu—Zn/kaolin material (Example 3, T3) and the reduced Cu—Zn/kaolin material (Example 4, T4).

The present invention refers to a solid comprising Cu(0) nanoparticles deposited on a phyllosilicate, wherein the size of one of the dimensions of the phyllosilicate is nanometric, and the size of the other two dimensions of the phyllosilicate is micrometric. The resulting solid is likewise a solid wherein the size of one of its dimensions is nanometric, and the size of its other two dimensions is micrometric. Said solid has reduced toxicity when employed as a biocidal agent.

The micrometric (also referred herein as micro or micro-sized) dimensions are perpendicular to the nano dimension (also referred to herein as nanometric or nano-sized dimension) and perpendicular relative to each other. Preferably, the thickness is the nanometric dimension.

The mean thickness of the solid (i.e. of the solid crystals, solid particles) is 100 nm or lower as determined using SEM (Scanning Electron Microscopy). Preferably, the mean thickness of the solid is between 10 and 100 nm. More preferably, the mean thickness of the solid is between 15 and 80 nm. More preferably, the mean thickness of the solid is between 15 and 70 nm. Even more preferably, the mean thickness of the solid is between 20 and 60 nm, in particular between 25 and 60 nm. Most preferably, the mean thickness of the solid is between 20 and 45 nm, preferably between 25 and 40 nm, and further more preferably between 30 and 40 nm. It should be noted that these mean thicknesses refer to a mean calculated from the thickness of the different solid crystals found in the solid of the invention. The individual solid crystals in the solid of the invention can present a thickness lower than 10 nm or higher than and 100 nm, provided that the mean thickness of the crystals in the solid of the invention is within the above specified values. However, preferably, the thickness of 95%, 90%, 80% or 70% of the crystals of the solid of the invention falls within the values mentioned for the mean thickness. In an embodiment, the mean value is calculated from the individual values of at least 10 randomly chosen crystals, or at least 15 randomly chosen crystals, or at least 20 randomly chosen crystals, or at least 30 randomly chosen crystals, or at least 50 randomly chosen crystals, or at least 100 randomly chosen crystals.

Each of the micro-sized dimensions (i.e. the first and the second micromtric dimension) of the solid, independently or simultaneously, have a mean size of between 200 and 1000 nm, preferably of between 200 and 600 nm, more preferably of between 300 and 500 nm as determined using SEM. It should be noted that these mean sizes refer to a mean calculated from the size of the specific dimension being measured of the different solid crystals found in the solid of the invention. The individual solid crystals in the solid of the invention can present a micro-sized dimension of a size as low as 50 or 60 nm or as high as 3000 nm, provided that the mean size of the measured dimension of the crystals in the solid of the invention is within the above specified values. Preferably, the size of each of the micro-dimensions of 95%, 90%, 80% or 70% of the crystals of the solid of the invention falls within the values mentioned for the mean size of said dimensions. In an embodiment, the mean value is calculated from the individual values of at least 10 randomly chosen crystals, or at least 15 randomly chosen crystals, or at least 20 randomly chosen crystals, or at least 30 randomly chosen crystals, or at least 50 randomly chosen crystals, or at least 100 randomly chosen crystals. The size of each micro-sized dimension may be the same or different.

It is understood in the above cases that, when the solid does not comprise crystals, what is measured and randomly chosen are particles, for example in cases where the solid of the invention is amorphous.

In the case of the Cu particles and/or any other particle (transition metals, post-transition metals and/or lanthanides) deposited on the phyllosilicate with Cu, all the dimensions are in nano size, particularly, the dimensions are equal to or less than 50 nm, as determined using TEM. Preferably, the nanoparticles have a mean size ranging between 1 and 20 nm as determined using TEM, more preferably between 1 and 10 nm, and even more preferably between 1 and 5 nm. The individual deposited nanoparticles in the solid of the invention can present sizes lower or higher than these mean values, provided that the mean size of the deposited nanoparticles in the solid of the invention is within the above specified mean values. Preferably, the size of 95%, 90%, 80% or 70% of the deposited nanoparticles falls within these mean values. In an embodiment, the mean value is calculated from the individual values of at least 10 randomly chosen deposited nanoparticles, or at least 15 randomly chosen deposited nanoparticles, or at least 20 randomly chosen deposited nanoparticles, or at least 30 randomly chosen deposited nanoparticles, or at least 50 randomly chosen deposited nanoparticles, or at least 100 randomly chosen deposited nanoparticles.

In the case of the support material, i.e. the phyllosilicate, and more specifically the delaminated phyllosilicate, the thickness has a nano dimension, while each of the other two dimensions are micro-sized. The sizes of the nano and micro-sized dimensions are those necessary to arrive at dimensions of the solid of the invention as described above. This generally corresponds to the size of the solid as described above minus the size of the deposited nanoparticles as described above. These support sizes are attained by processes of delamination such as those described further below.

In an embodiment, in addition to Cu(0) nanoparticles, the solid of the invention comprises also nanoparticles of a water insoluble Cu(I) or Cu(II) compound such as a copper oxide deposited on the phyllosilicate. In a particular embodiment, the copper oxide is Cu(I) oxide, Cu (II) oxide, Cu (III) oxide or copper peroxide. In a more particular embodiment it is Cu (I) oxide or Cu (II) oxide. Even more particularly, it is Cu (II) oxide.

In a particular embodiment, the molar ratio of [Cu(0) nanoparticles]:[Cu(I) and Cu(II) nanoparticles combined] deposited on the phyllosilicate is higher than 1:10, preferably higher than 1:1, more preferably higher than 10:1, even more preferably higher than 100:1. In another embodiment, all of the copper nanoparticles deposited on the phyllosilicate are in the form of Cu(0) nanoparticles.

Figure 3:
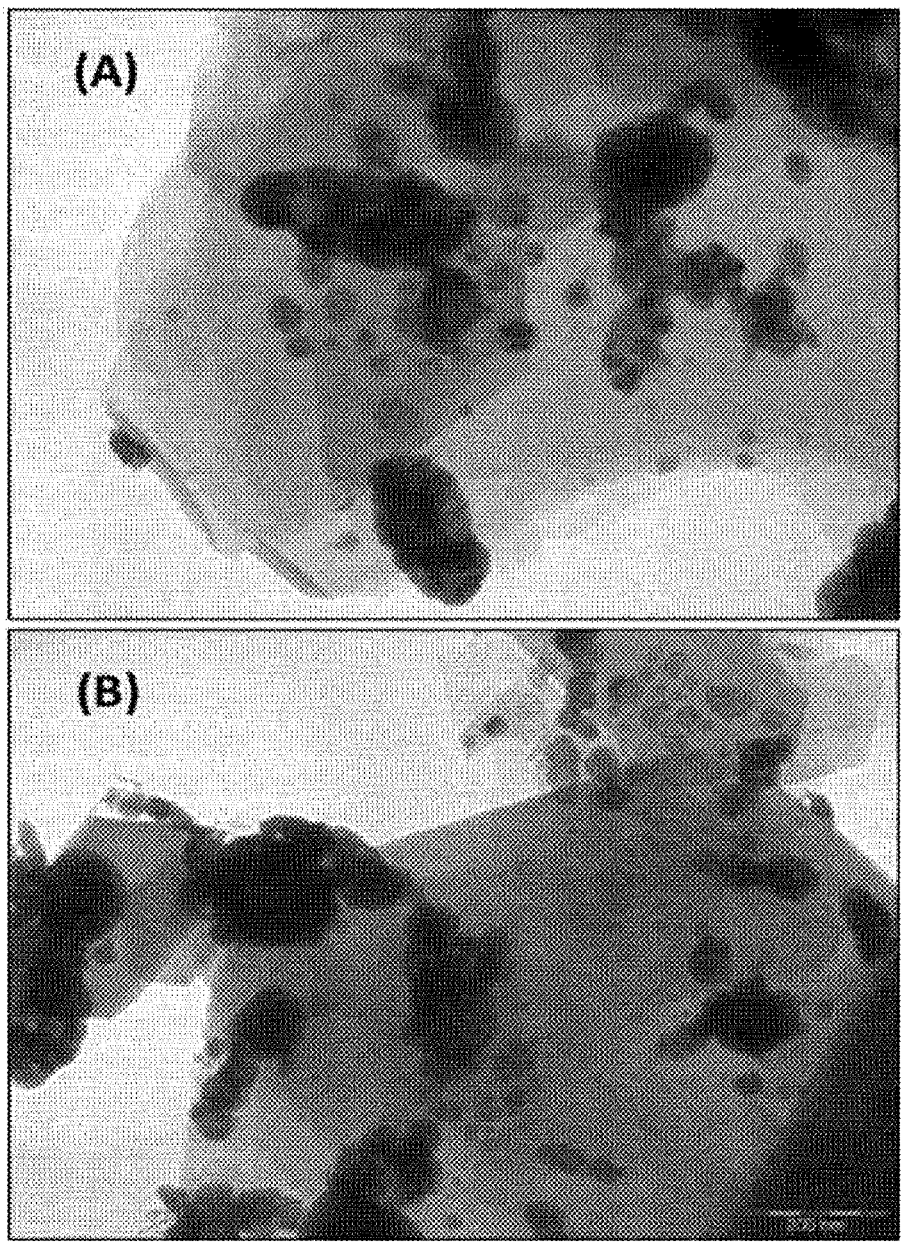
FIGS. 3A and 3B show a comparative graph of the micrographs obtained by transmission electron microscopy (TEM) of the Cu/kaolin materials of Examples 1 and 2. FIG.

Unlike silver, copper does not readily form nanoparticles, and the nanoparticles it forms are not regular and spherical like silver nanoparticles, and tend to clump together and form irregular associations, and as seen in FIG. 3, although they have a size of less than 100 nanometers, they tend to distribute on the support in an irregular manner.

Figure 4:
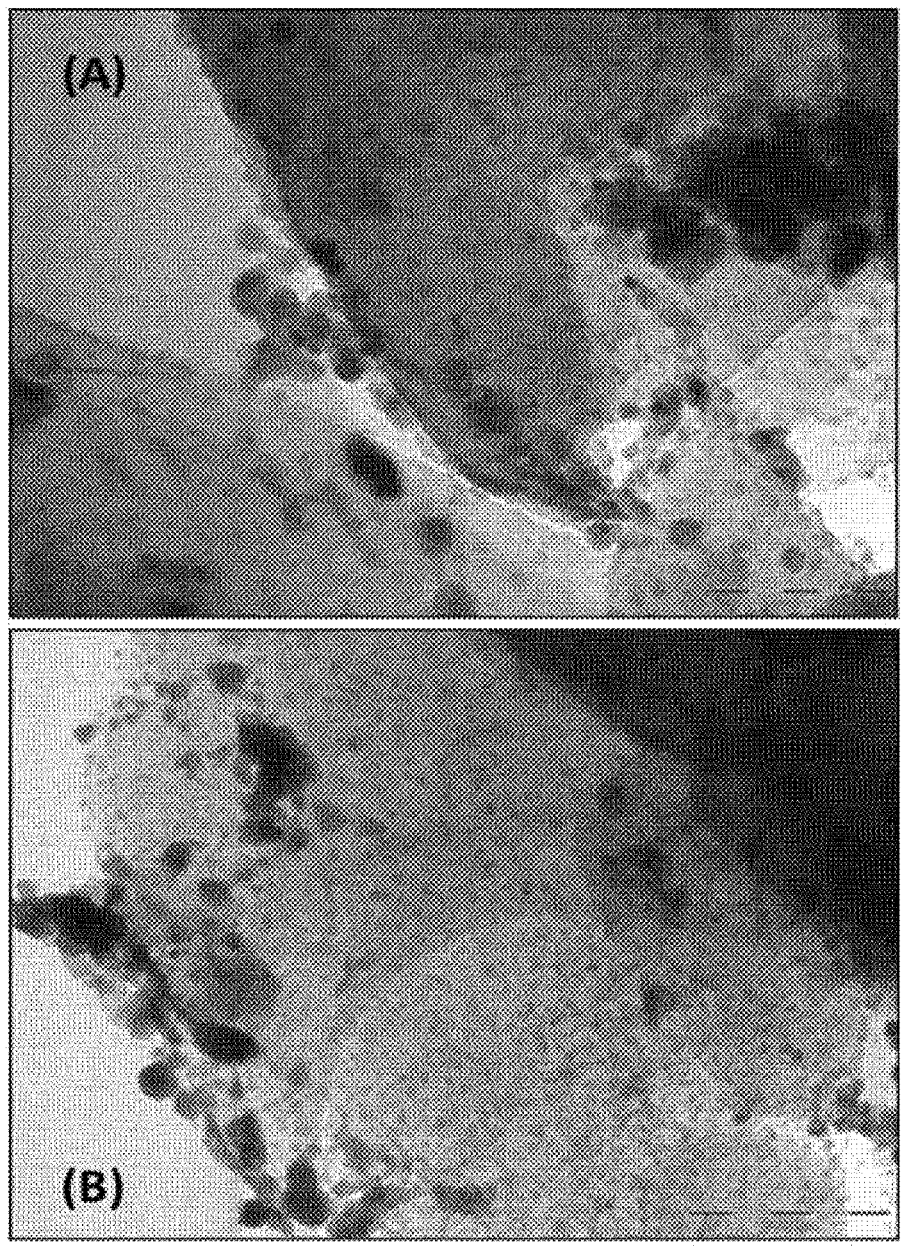
FIGS. 4A and 4B show a comparative graph of the micrographs obtained by transmission electron microscopy (TEM) of the Cu—Zn/kaolin materials of Examples 4 and 5.

The present inventors have now surprisingly and advantageously found that when copper is deposited together with other metals (transition metals, post-transition metals and/or lanthanides), particularly with zinc, the copper nanoparticles show a smaller size and, above all, a much more homogeneous distribution as seen in FIG. 4. The association of copper with other metals is not limited only to increasing the quality of particulate metal deposition, but also to increasing its biocidal action. Additionally, the association of copper with other metals is not limited only to increasing its biocidal action directly, but also indirectly by increasing the quality of particulate metal deposition.

Specifically, in an embodiment, the solid of the invention comprises, in addition to the Cu(0) nanoparticles, or in addition to the Cu(0) and Cu(I) and/or Cu(II)nanoparticles, nanoparticles of one or more transition metals, post-transition metals and/or lanthanides, in either their metallic or cationic forms, deposited on the phyllosilicate. Preferably, one or more transition metals in either their metallic or cationic forms, are deposited on the phyllosilicate. In a particular embodiment, nanoparticles of Zn, Ti, Sn, Zr, Fe, Co, Ni, V, Mo, W, Ce, La, Ga, Au or Ag, or combinations thereof, in either their metallic or cationic forms, are deposited on the phyllosilicate. Preferably, nanoparticles of Zn, Fe, Ga or Ag, or combinations thereof, in either their metallic or cationic forms, are deposited on the phyllosilicate. In an embodiment, in any of the above embodiments, the one or more transition metals, post-transition metals and/or lanthanides deposited on the phyllosilicate are associated with the nanoparticular Cu (0) or Cu(I) and/or Cu(II) (e.g. Cu oxide). In another embodiment, in any of the above embodiments, the one or more transition metals, post-transition metals and/or lanthanides deposited on the phyllosilicate are co-deposited on the phyllosilicate with the nanoparticular Cu (0) or Cu(I) and/or Cu(II) (e.g. Cu oxide).

In a particularly preferred embodiment, the solid of the invention comprises, in addition to the Cu(0) nanoparticles, Zn(0) nanoparticles or Zn(II) nanoparticles deposited on the phyllosilicate. In addition to the Zn(0) or Zn(II) nanoparticles, the solid of the invention can comprise nanoparticles of one or more transition metals, post-transition metals and/or lanthanides as described in the above embodiments, deposited on the phyllosilicate.

The [Cu nanoparticle]:[transition metal, post-transition metal and lanthanide nanoparticle combined] molar ratio, particularly the [Cu nanoparticle]:[Zn nanoparticle] molar ratio, or the [Cu and Zn nanoparticle combined]:[transition metal, post-transition metal and lanthanide nanoparticle combined (excluding Zn)] molar ratio can range between approximately 1:1 and 10:1, preferably between approximately 1:1 and 5:1, and even more preferably between approximately 1:1 and 2:1. In a particular embodiment [Cu nanoparticle] refers to [Cu(0), Cu(I) and Cu(II) nanoparticle combined], in another particular embodiment it refers only to [Cu(0) nanoparticle]. In a particular embodiment [Zn nanoparticle] refers to [Zn(0) and Zn(II) nanoparticle combined], in another particular embodiment it refers only to [Zn(0) nanoparticle]. A good nanoparticle distribution and formation in the support is obtained in these ranges, and good to excellent biocidal activity is observed.

Preferably, the total amount by weight of all the deposited nanoparticles on the support does not exceed 25% by weight based on 100% by weight of the solid of the invention.

According to the present invention, the inorganic matrix used as a support for the deposition of Cu is a phyllosilicate, i.e. a silicate that can form a plurality of adjacent bound layers or sheets. In a particular embodiment, the inorganic support is a phyllosilicate sheet or layer. In a preferred embodiment, the phyllosilicate is obtained from a phyllosilicate which can be delaminated.

The phyllosilicate can be hydrated or not hydrated. The phyllosilicate can be natural or synthetic. The phyllosilicate can be an amorphous, mesoporous, microporous, combined micro- and mesoporous material, and mixtures thereof.

In a particular embodiment of the present invention, the inorganic matrix used as a support for the deposition of Cu is a phyllosilicate of the clay mineral type. The phyllosilicate is preferably selected from kaolin, metakaolin, montmorillonite, sepiolite, vermiculite, mica, talc or any of the combinations thereof. In a preferred embodiment, the phyllosilicate is selected from kaolin, metakaolin, talc, montmorillonite, or any of the combinations thereof. More preferably, the phyllosilicate is selected from the group formed by kaolin, metakaolin and combinations thereof, which have the best laminarity. Laminarity is the ease for being separated into sheets. Therefore, greater laminarity results in a better distribution of the material on the plants, allowing a better biocidal effect. In a particular embodiment, the phyllosilicate is kaolin. In a particular embodiment, the phyllosilicate is metakaolin. In a particular embodiment, the phyllosilicate is talc. In a particular embodiment, the phyllosilicate is montmorillonite.

In another embodiment of the present invention, the inorganic matrix used as a support for the deposition of Cu comprises an amorphous-type phyllosilicate material preferably selected from silicas-aluminas with Si/Al molar ratios between 1 and 200, and more preferably between 5 and 100, and with surface areas greater than 50 $m^2/g$, determined using the BET method on the adsorption of gas molecules on a solid surface.

In another particular embodiment of the present invention, the inorganic matrix used as a support for the deposition of Cu comprises an ordered mesoporous-type phyllosilicate material preferably selected from silicas-aluminas, MCM-41-, MCM-48-, SBA-15-type materials, with Si/Al molar ratios between 1 and 500, and more preferably between 10 and 200, and with surface areas greater than 200 $m^2/g$, determined using the BET method.

In a preferred embodiment of this invention, the Cu deposited on the phyllosilicate is in amounts between 0.001 and 25% by weight, preferably between 0.1 and 15% by weight, even more preferably between 1 and 15% by weight, still more preferably between 5 and 15% by weight, still more preferably between 10 and 15% by weight, and most preferably between 12 and 14% by weight, always based on 100% by weight of the solid of the invention. In a particular embodiment, Cu refers to Cu(0). In another particular embodiment, Cu refers to Cu(0) and Cu(I) and Cu(II) combined.

In another preferred embodiment of this invention, a combination of Cu and Zn is deposited on the phyllosilicate in amounts the total sum of which is between 0.001 and 25% by weight, preferably between 0.1 and 15% by weight, even more preferably between 1 and 15% by weight, still more preferably between 5 and 15% by weight, still more preferably between 10 and 15% by weight, and most preferably between 12 and 14% by weight, always based on 100% by weight of the solid of the invention. In a particular embodiment, Cu refers to Cu(0). In another particular embodiment, Cu refers to Cu(0) and Cu(I) and Cu(II) combined. In a particular embodiment, Zn refers to Zn(0). In another particular embodiment, Zn refers to Zn(0) and Zn(II) combined.

Figure 5:
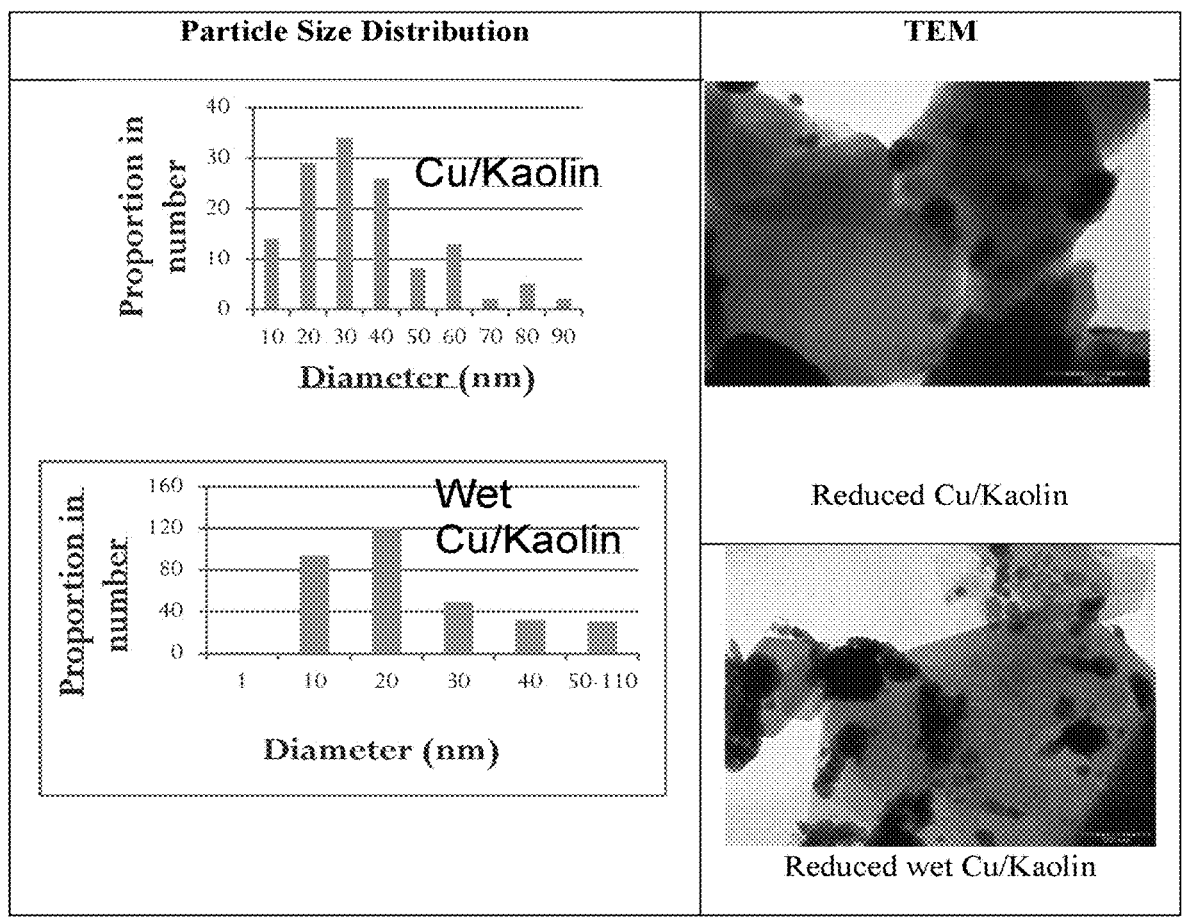
FIG. 5 shows the size comparison of the metallic particles and the distribution thereof between wet Cu/kaolin (wet impregnation) and Cu/kaolin (incipient impregnation), both materials being reduced materials.

A second aspect of the present invention relates to a manufacturing method for manufacturing the solid of the invention. The method of deposition can influence the quality of nanoparticle distribution. For example, one way of influencing the quality of distribution is in relation to the volume of the dilution. Two models described in this specification in a non-limiting manner are wet impregnation and incipient impregnation. When working with a significant dilution to carry out wet impregnation, as in the case of Examples 1 to 5, the particle size and distribution seem to be better than when working with an incipient volume, a method which involves working with the smallest amount of water to fill all the pores and wet the entire surface of the support, as seen in FIG. 5. Nevertheless, both models allow obtaining the solids according to the invention.

The solid of the invention is preferably manufactured by preparing an aqueous suspension of the phyllosilicate in the presence of a surfactant, adding a Cu(0) and/or Zn(0) precursor to the suspension and carrying out the precipitation or deposition of the reduced or non-reduced metal precursors. Subsequently, the solid is isolated and treated to be used as a biocide.

The method generally comprises the following steps:
i) delaminating a phyllosilicate;
ii) depositing Cu(0) nanoparticles on the delaminated phyllosilicate.

The objective of step i) is to produce phyllosilicate material/crystals (sheets or sheet) with a nanometric thickness and micrometric remaining dimensions as described further above onto which Cu(0) nanoparticles can be deposited. Preferably, delamination of the original phyllosilicate can lead to a mean thickness of the resulting phyllosilicate sheets/crystals (which represents the support in the solid of the invention) of down to between 1 and less than 100 nm. The mean size of each of the micro-sized dimensions of the delaminated phyllosilicate is generally, independently or simultaneously, between 150 nm and less than 1000 nm.

In an embodiment, at least 50% by weight of the phyllosilicate is delaminated.

Preferably, at least 70%, 80% or 90% by weight of the phyllosilicate is delaminated. Even more preferably 95% by weight of the phyllosilicate is delaminated. In a most preferred embodiment, the phyllosilicate is completely delaminated (over 99% by weight of the phyllosilicate is delaminated).

Delamination of the phyllosilicate can be achieved in a variety of ways. The delamination can be a chemical, physical or mechanical delamination or a combination thereof. In an embodiment, delamination includes exfoliation. In an embodiment, delamination is exfoliation.

In a preferred embodiment, the delamination is chemical delamination. In another preferred embodiment, the delamination is combined (simultaneous or sequential) chemical and mechanical delamination, wherein the mechanical delamination is preferably by agitation.

In a particular embodiment, chemical delamination comprises treating the phyllosilicate with hydrogen peroxide.

In a preferred embodiment, chemical delamination comprises treating the phyllosilicate with a surfactant.

In a preferred embodiment, the surfactant is an anionic surfactant. Preferably, the anionic surfactant corresponds to the formula RQ⁻ where R is an aryl or alkyl group containing more than 6 and less than 36 carbon atoms, and Q is a carboxylate, phosphate, sulfonate, or sulfate group, more particularly it is a carboxylate, phosphate or sulfate group, preferably it is a sulfate group. Preferably R is an alkyl group containing more than 6 and less than 36 carbon atoms, and Q is a carboxylate, phosphate, sulphonate, or sulfate group, more particularly it is a carboxylate, phosphate or sulfate group, preferably it is a sulfate group. Preferably the number of carbons in R is between 7 and 16, more preferably between 8 and 14.

An example of RQ⁻ is dodecyl sulfate or stearate. Preferably the surfactant is sodium dodecyl sulfate (SDS), sodium tridecyl sulfate (STS), or sodium tetradecyl sulfate. Preferably the surfactant is dodecyl sulfate.

Anionic surfactants are preferably employed as the alkali or alkaline earth metal salt thereof, in particular as the Na, K, Mg or Ca salt thereof, preferably as the Na salt thereof. A preferred example is sodium dodecyl sulfate.

Polycarboxylate surfactants are also particularly preferred, in particular those of the Dolapix series commercially available from Zschimmer & Schwarz GmbH, such as the CE64, ET85, PC67, G10, G25, G6 or P8010 products.

In another embodiment, the surfactant is a phospholipid. Non-limiting examples of phospholipids are phosphatidylcholine and phosphatidyl-diethanolamine.

In another embodiment, the surfactant is a non-ionic surfactant. Preferably, the non-ionic surfactant is selected from polyoxyethylene alkyl ether, polyoxyethylene stearyl-cetyl ether, sorbitan esters of fatty acids (for example, Span® series of MERCK), Polysorbate (for example, Tween® series of MERCK), alkylphenol ethoxylates, nonylphenol ethoxylates (NPEOs), and fatty alcohol ethoxylates.

In an embodiment, the surfactant is a cationic surfactant. Preferably, the cationic surfactant is a quaternary ammonium surfactant. Preferably it is a quaternary ammonium surfactant according to the following formula:

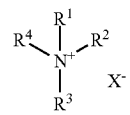

wherein X is a halide; and $R^1$, $R^2$, $R^3$, and $R^4$ are selected from H and $C_1$-$C_{30}$ alkyl chains, which may be linear or branched, further wherein the alkyl chain may optionally contain an aromatic moiety. In a particular embodiment, the surfactant is tetralkylammonium halide, dimethyldioctadecylammonium halide, cetyltrimethylammonium halide, or benzalkonium halide. Halide refers to chloride, bromide, fluoride or iodide, preferably chloride or bromide.

In an embodiment, where the surfaces of the phyllosilicate sheets have negative charges, or are neutral, then an anionic or non-ionic surfactant is preferably selected. In another embodiment, where the surfaces of the phyllosilicate sheets carry positive charges, a cationic surfactant is preferably selected.

Alternatively, or additionally to chemical delamination, delamination is effected physically or mechanically. Preferably, physical or mechanical delamination is effected in addition to chemical delamination, more particularly in addition to chemical delamination which comprises treating the phyllosilicate with a surfactant.

Physical delamination comprises for instance heating the phyllosilicate above room temperature (above 25° C.), usually above 70° C. This is known as thermal delamination. The temperature at which delamination takes place depends on a number of factors, such as the specific phyllosilicate that is employed.

Mechanical delamination comprises for instance subjecting the phyllosilicate to agitation, sonication, milling (e.g. ball milling) or grinding (e.g. percussion grinding).

Step ii) includes direct deposition of Cu(0) nanoparticles as well as their indirect deposition, indirect deposition meaning that the species which is initially deposited on the phyllosilicate is not the Cu(0) nanoparticles, but another species (such as nanospecies comprising cationic Cu) which is then converted to said metallic Cu(0) nanoparticles.

In a particular embodiment, step ii) involves:
ii-1) adding a precursor of Cu(0) nanoparticles to the delaminated phyllosilicate;
ii-2) optionally converting the precursor to a copper oxide (such as CuO or $Cu_2O$);
ii-3) reducing the Cu(0) precursor or copper oxide to Cu(0).

In an embodiment, the method comprises:
a) preparing an aqueous suspension of the phyllosilicate with a surfactant, and optionally employing other means of delamination as described above,
b) adding to the suspension obtained in (a) at least one precursor of Cu(0) nanoparticles, and optionally reducing the precursor to Cu(0);
c) depositing the precursor, or Cu(0) if reduction took place, from the suspension prepared in step b), and
d) recovering the solid formed in step c) (with optional filtering, washing, preferably with distilled water) and drying the recovered solid.

To produce the solid of the invention with metallic nanoparticles of copper, i.e. with Cu(0), and optionally with any additional metal nanoparticles that can be deposited alongside Cu(0) as described further above, an additional step comprising reduction of the metal precursor or metal precursors is carried out if it was not carried out before deposition.

Thus, in one alternative, the reduction is carried out in an aqueous medium by slowly adding to the suspension obtained in b), under vigorous stirring, a reducing agent which is selected from $H_2$, a hydride, a sugar, an alcohol, or a combination of some of them, at a temperature below 100° C. In another alternative, the reduction is carried out on the dry product after step d) by placing the dried solid in an $H_2$ (reducing) atmosphere at temperatures between 150 and 550° C.

To produce the solid of the invention with metallic nanoparticles of copper, i.e. with Cu(0), and optionally with any additional metal nanoparticles that can be deposited alongside Cu as described further above, an additional step comprising thermal treatment, for example calcining, of the metal precursor or metal precursors in the solid obtained in step d) is carried out. Calcination is preferably carried out by placing the dried solid in an air atmosphere at temperatures between 200 and 600° C.

In a preferred embodiment of the method of the present invention, the surfactant used in step (a) is any of those described above.

In one embodiment of the present invention, the surfactant is added to the suspension prepared in step (a) of the method at a low concentration. The concentration of surfactant agent used preferably ranges between 0.0001 and 10% by weight, and more preferably between 0.001 and 5% by weight based on the total weight of the solids of the suspension.

In one embodiment of the present invention, the surfactant is added to the suspension prepared in step (a) of the method at a low concentration. The concentration of surfactant agent used preferably ranges between 0.0001 and 10% by weight, and more preferably between 0.001 and 5% by weight, and still more preferably between 0.001 and 0.1% by weight, and most preferably between 0.009 and 0.05% by weight based on the total weight of the phyllosilicate in the suspension.

Preferably, the surfactant used is an anionic surfactant as described above.

In a particular embodiment, the phyllosilicate is kaolin, metakaolin or a mixture thereof and the surfactant is an anionic surfactant as described above.

In a preferred embodiment, the method of the present invention comprises a step (a) of preparing an aqueous suspension of the phyllosilicate using a solid:liquid weight ratio ranging between 0.0001 and 1, and more preferably between 0.001 and 0.25 (before addition of surfactant).

The objective of this step a) is to produce a suspension comprising sheets of phyllosilicate material which is delaminated as much as possible and has the smallest thickness possible, offering the maximum available surface area for metal deposition.

In a preferred embodiment, the method of the present invention comprises a step (b) of adding to the aqueous suspension prepared in step (a) at least one precursor of Cu(0) nanoparticles. Water-soluble salts and compounds containing cationic Cu (such as Cu(I) or Cu(II)) can be used as precursors, non-limiting examples being nitrates, halides, sulfates, carboxylates and oxoacids in general. The precursor used is preferably copper nitrate. Where deposition of Zn(0) nanoparticles is also desired, water-soluble salts and compounds containing cationic Zn can be used as Zn(0) nanoparticle precursors, non-limiting examples being nitrates, halides, sulfates, carboxylates and oxoacids in general. The Zn(0) nanoparticle precursor used is preferably Zn acetate. It is understood that the terms "precursor" and "cation" are used herein in an interchangeable manner when referring to nanoaprticles of Cu or Zn. A precursor based on Cu and/or Zn and also on any another transition metal, post-transition metal and/or lanthanide that can be used according to the invention comprises at least any form available on the market of the metals which are usually the respective cationic salts.

In a preferred embodiment, the method of the present invention comprises a step (b) of adding to the aqueous suspension prepared in step (a) at least one precursor of Cu(0) nanoparticles which is diluted in an aqueous solution. This aqueous solution containing the precursor or precursors can be added directly and after a few seconds to the aqueous suspension prepared in step (a) or can be added slowly and dropwise to the aqueous suspension prepared in step (a) with continuous stirring. The addition of the precursor or precursors to the aqueous suspension prepared in step (a) is preferably performed slowly and dropwise with constant stirring of the system during the entire time the addition takes place.

In a preferred embodiment, the method of the present invention comprises a step (b) of adding to the aqueous suspension prepared in step (a) at least one precursor of Cu(0) nanoparticles, wherein the precursor is diluted in an aqueous solution, at the required concentration so that the elemental Cu content present in the final solid material is between 0.001 and 25% by weight, and more preferably between 0.1 and 15% by weight, even more preferably between 1 and 15% by weight, still more preferably between 5 and 15% by weight, still more preferably between 10 and 15% by weight, and most preferably between 12 and 14% by weight, always based on 100% by weight of the final solid material.

In a preferred embodiment, the method of the present invention comprises as part of step (b) additionally adding to the aqueous suspension prepared in step (a) at least one precursor of Zn(0) nanoparticles, wherein the precursor is diluted in an aqueous solution, at the required concentration so that the elemental Zn content present in the final solid material is between 0.001 and 25% by weight, and more preferably between 0.1 and 15% by weight, even more preferably between 1 and 15% by weight, still more preferably between 5 and 15% by weight and most preferably between 5 and 10% by weight, always based on 100% by weight of the final solid material.

In a preferred embodiment, the method of the present invention comprises a step (b) of adding to the aqueous suspension prepared in step (a) at least one precursor of Cu(0) nanoparticles and at least one precursor of Zn(0) nanoparticles, wherein the precursors are diluted in an aqueous solution, at the required concentrations so that the sum of the elemental Cu and elemental Zn contents present in the final solid material is between 0.001 and 25% by weight, and more preferably between 0.1 and 15% by weight, even more preferably between 1 and 15% by weight, still more preferably between 5 and 15% by weight, still more preferably between 10 and 15% by weight, and most preferably between 12 and 14% by weight, always based on 100% by weight of the final solid material.

In another preferred embodiment, in addition to any precursor of Cu(0) and optionally Zn(0) nanoparticles, at least one precursor of nanoparticles of a transition metal, post-transition metal and/or lanthanide is added to the aqueous suspension prepared in step (a). In a preferred embodiment the precursor is a precursor of nanoparticles of a transition metal. In a particular embodiment, the precursor is a precursor of nanoparticles of Ti, Sn, Zr, Fe, Co, Ni, V, Mo, W, Ce, La, Ga, Au, Ag and combinations thereof. Preferably, the precursor is a precursor of nanoparticles of Zn, Fe, Ga or Ag.

In a preferred embodiment, the method of the present invention comprises a step (b) of adding to the aqueous suspension prepared in step (a), firstly, a precursor of Cu(0) nanoparticles which is diluted in an aqueous solution, and secondly, a precursor of Zn(0) nanoparticles which is diluted in an aqueous solution, both at the required concentrations so that the sum of the elemental Cu and elemental Zn contents present in the final solid material is between 0.001 and 25% by weight, and more preferably between 0.1 and 15% by weight, even more preferably between 1 and 15% by weight, still more preferably between 5 and 15% by weight, still more preferably between 10 and 15% by weight, and most preferably between 12 and 14% by weight, always based on 100% by weight of the final solid material.

In a preferred embodiment, the method of the present invention comprises a step (b) of adding to the aqueous suspension prepared in step (a), firstly, a precursor of Zn(0) nanoparticles which is diluted in an aqueous solution, and secondly, a precursor of Cu(0) nanoparticles which is diluted in an aqueous solution, both at the required concentrations so that the sum of the elemental Cu and elemental Zn contents present in the final solid material is between 0.001 and 25% by weight, and more preferably between 0.1 and 15% by weight, even more preferably between 1 and 15% by weight, still more preferably between 5 and 15% by weight, still more preferably between 10 and 15% by weight, and most preferably between 12 and 14% by weight, always based on 100% by weight of the final solid material.

In a preferred embodiment, the method of the present invention comprises a step (c) of precipitating the precursor or precursors contained in the aqueous suspension prepared in step (b), by means of controlling the pH of the suspension at values greater than 8, preferably between 8 and 10 under constant stirring, followed by a period of aging of the aqueous suspension or mixture. Preferably and after the suspension is brought to the required pH, it is left to stir continuously between 1 and 12 hours, and more preferably between 2 and 8 hours, for subsequently leaving the mixture to age for between 6 and 24 hours, and more preferably between 10 and 20 hours.

In a preferred embodiment, the method of the present invention comprises a step (d) of filtering the mixture obtained from step (c) and subsequent washing with water, preferably distilled water, for then drying the recovered solid in an air atmosphere and at a temperature between 40 and 100° C.

In a preferred embodiment, the method of the present invention comprises a step (e) of thermally treating the solid obtained in step (d) by means of a calcination process in an air atmosphere, an $O_2$-enriched air atmosphere, an atmosphere of mixtures of $O_2$ with other inert gases ($N_2$, argon, among others), and combinations thereof, and at controlled temperatures. The calcination process is preferably carried out at temperatures between 200 and 600° C., and more preferably between 350 and 550° C. Although it will depend on the amount of solid to be calcined, this calcination is preferably carried out in an interval from 1 to 12 hours, and more preferably from 2 to 8 hours.

In a preferred embodiment, the method of the present invention comprises a step (e) of thermally treating the solid obtained in step (d), by means of a reduction process in a hydrogen atmosphere, an atmosphere of mixtures of $H_2$ with other inert gases ($N_2$, argon, among others), and combinations thereof, and at controlled temperatures. The reduction process is preferably carried out at temperatures between 150 and 550° C., and more preferably between 250 and 450° C. Although it will depend on the amount of solid to be reduced, this reduction is preferably carried out in an interval from 1 to 12 hours, and more preferably from 1 to 5 hours.

An alternative to the method of the present invention for the production of the solid of the invention comprises performing the reduction process in an aqueous medium mentioned above by means of adding a solution containing reducing agent such as $NaBH_4$ dropwise, under stirring, or hydrogenation in a chemical reactor at a controlled temperature using a reducing agent selected from $H_2$, metal hydrides, alcohols, sugars and combinations thereof.

Another alternative to the method of the present invention for manufacturing the solid of the invention comprises the following steps:
a) impregnating the phyllosilicate with at least one precursor of Cu(0) nanoparticles which is diluted in water for deposition of the metal precursors;
b) filtering, washing, preferably with distilled water, and drying the recovered solid; and
c) thermally treating same in an air (calcining) atmosphere at temperatures between 200 and 600° C. or in an $H_2$ (reducing) atmosphere at temperatures between 150 and 550° C.

In a preferred embodiment, this mentioned alternative of the method of the present invention comprises a step (a) of impregnating the phyllosilicate with one or more precursors.

The impregnation process mentioned above can be wet impregnation, incipient impregnation, impregnation by means of deposition-precipitation.

Water-soluble salts and compounds containing cationic Cu can be used as precursors of Cu(0) nanoparticles, non-limiting examples being nitrates, halides, sulfates, carboxylates and oxoacids in general. The precursor used is preferably copper nitrate.

Where deposition of Zn(0) nanoparticles is also desired, water-soluble salts and compounds containing cationic Zn can be used as precursors of Zn(0) nanoparticles, non-limiting examples being nitrates, halides, sulfates, carboxylates and oxoacids in general. The precursor used is preferably Zn acetate.

In a preferred embodiment, this mentioned alternative of the method of the present invention comprises a step (a) of impregnating the phyllosilicate with a precursor of Cu(0) nanoparticles which is diluted in an aqueous solution, at the required concentration so that the elemental Cu content present in the final solid material is between 0.001 and 25% by weight, and more preferably between 0.1 and 15% by weight, even more preferably between 1 and 15% by weight, still more preferably between 5 and 15% by weight, still more preferably between 10 and 15% by weight, and most preferably between 12 and 14% by weight, always based on 100% by weight of the solid of the invention.

In a preferred embodiment, this mentioned alternative of the method of the present invention comprises as part of step (a) additionally impregnating the phyllosilicate with a precursor of Zn(0) nanoparticles which is diluted in an aqueous solution, at the required concentration so that the elemental Zn content present in the final solid material is between 0.001 and 25% by weight, and more preferably between 0.1 and 15% by weight, even more preferably between 1 and 15% by weight, still more preferably between 5 and 15% by weight and most preferably between 5 and 10% by weight, always based on 100% by weight of the solid of the invention.

In a preferred embodiment, this mentioned alternative of the method of the present invention comprises a step (a) of impregnating the phyllosilicate with a precursor of Cu(0) nanoparticles and a precursor of Zn(0) nanoparticles, wherein the precursors are diluted in an aqueous solution, at the required concentrations so that the sum of the elemental Cu and elemental Zn contents present in the final solid material is between 0.001 and 25% by weight, and more preferably between 0.1 and 15% by weight, even more preferably between 1 and 15% by weight, still more preferably between 5 and 15% by weight, still more preferably between 10 and 15% by weight, and most preferably between 12 and 14% by weight, always based on 100% by weight of the solid of the invention.

In a preferred embodiment, this mentioned alternative of the method of the present invention comprises a step (a) of impregnating the phyllosilicate with, firstly, a precursor of Cu(0) nanoparticles which is diluted in an aqueous solution, and secondly, a precursor of Zn(0) nanoparticles which is diluted in an aqueous solution, both at the required concentrations so that the sum of the elemental Cu and elemental Zn contents present in the final solid material is between 0.001 and 25% by weight, and more preferably between 0.1 and 15% by weight, even more preferably between 1 and 15% by weight, still more preferably between 5 and 15% by weight, still more preferably between 10 and 15% by weight, and most preferably between 12 and 14% by weight, always based on 100% by weight of the solid of the invention.

In a preferred embodiment, this mentioned alternative of the method of the present invention comprises a step (a) of impregnating the phyllosilicate with, firstly, a precursor of Zn(0) nanoparticles which is diluted in an aqueous solution, and secondly, a precursor of Cu(0) nanoparticles which is diluted in an aqueous solution, both at the required concentrations so that the sum of the elemental Cu and elemental Zn contents present in the final solid material is between 0.001 and 25% by weight, and more preferably between 0.1 and 15% by weight, even more preferably between 1 and 15% by weight, still more preferably between 5 and 15% by weight, still more preferably between 10 and 15% by weight, and most preferably between 12 and 14% by weight, always based on 100% by weight of the solid of the invention.

In any of the above embodiments, impregnation of the phyllosilicate with at least one precursor of nanoparticles of a transition metal, post-transition metal and/or lanthanide is additionally carried out. In a preferred embodiment the precursor is a precursor of nanoparticles of a transition metal. In a particular embodiment, the precursor is a precursor of nanoparticles of Ti, Sn, Zr, Fe, Co, Ni, V, Mo, W, Ce, La, Ga, Au, Ag and combinations thereof. Preferably, the precursor is a precursor of nanoparticles of Zn, Fe, Ga or Ag.

Another alternative to the method of the present invention mentioned above for the production of the solid of the invention comprises performing the reduction process of step (c) mentioned above by means of hydrogenation in a chemical reactor at a controlled temperature using a reducing agent selected from $H_2$, $NaBH_4$, alcohols, and combinations thereof.

A third aspect of the present invention relates to the use of the solids of the invention as biocidal agents.

As used herein, "biocidal" or "biocide" is used indistinctively to refer to efficacy or activity against pathogenic microorganisms, specifically against viruses, bacteria, or fungi, that prevents, reduces or eliminates infections or damages caused by the pathogenic microorganism. Biocidal activity includes antifungal, antiviral, and antibacterial activity.

In an embodiment, the solids of the invention act as an antibacterial agent. An "antibacterial agent," as used herein, refers to a bioprotectant agent that prevents, reduces or eliminates in vitro and/or in vivo infections or damages caused by a bacterium.

In a particular embodiment, the solids of the invention act as an antibacterial agent against *Pseudomonas avenue, Xanthomonas campestris, Enterobacter dissolvens, Erwinia carotovora, Clavibacter michiganensis, Pseudomonas syringae, Bacillus subtilis, Erwinia stewartii, Spiroplasma kunkelli, Pseudomonas amygdali, Curtobacterium flaccumfaciens*, and *Ralstonia solanacearum*.

In an embodiment, the solids of the invention act as an antiviral agent. An "antiviral agent," as used herein, refers to a bioprotectant agent that prevents, reduces or eliminates in vitro and/or in vivo infections or damages caused by a virus.

In a particular embodiment, the solids of the invention act as an antiviral agent against the virus is the tobacco mosaic virus, cucumber mosaic virus, cucumber green mottle mosaic virus, potato virus X, lettuce mosaic virus, melon necrotic spot virus, Tomato spotted wilt virus, Tomato yellow leaf curl virus, Potato virus Y, Cauliflower mosaic virus, African cassava mosaic virus, Plum pox virus, Brome mosaic virus, Citrus tristeza virus, Barley yellow dwarf virus, Potato leafroll virus or Tomato bushy stunt virus.

In a preferred embodiment, the solids of the invention act as an antifungal agent. An "antifungal agent," as used herein, refers to a bioprotectant agent that prevents, reduces or eliminates in vitro and/or in vivo infections or damages caused by a fungus.

In a particular embodiment, the solids of the invention act as an antifungal agent against sporangia, and more particularly against protists, even more particularly against oomycetes, and most particularly against *Phytophthora infestans, Colletotricum gloeosporoides, Colletotrichum acutatum, Gloeosporum olivarum, Fusicladium oleagineum, Cycloconium oleaginym, Blumeria graminis, Uncinula necator, Plasmopara viticola, Macrophoma dalmatica, Botrytis cinirea, Guignardia bidwellii, Aecidium* spp., *Albugo* spp., *Alternaria* spp., *Angiosorus* spp., *Anisogramma* spp., *Aphanomyces* spp., *Apiognomonia* spp., *Apiosporina* spp., *Armillaria* spp., *Ascochyta* spp., *Aspergillus* spp., *Atropellis* spp., *Bipolaris* spp., *Blumeria* spp. *spp., Botryosphaeria* spp., *Botrytis* spp., *Bremia* spp., *Caeoma* spp., *Calyculosphaeria* spp., *Ceratocystis* spp., *Cercoseptoria* spp., *Cercospora* spp., *Charala* spp., *Chondrostereum* spp., *Chrysomyxa* spp., *Ciborinia* spp., *Cladosporium* spp, *Claviceps* spp., *Cochliobolus* spp., *Colletotrichum* spp., *Coniella* spp., *Coniocybe* spp., *Coniothyrium* spp, *Corynespora* spp., *Cronartium* spp., *Cryphonectria* spp., *Cryptodiaporthe* spp., *Curvularia* spp., *Cyhndrocarpon* spp., *Cylindrocladium* spp., *Cymadothea* spp., *Dematophora* spp., *Diaporthe* spp., *Diatrype* spp., *Didymella* spp., *Diplocamon* spp., *Discostroma* spp., *Dothiora* spp., *Dothiorella* spp., *Drechslera* spp., *Drepanopeziza* spp., *Elsinoë* spp., *Endocronartium* spp., *Endophyllum* spp., *Entomosporium* spp., *Entyloma* spp., *Epichloë* spp., *Erysiphe* spp., *Eutypa* spp., *Exobasidium* spp., *Exserohilum* spp., *Fulvia* spp., *Fusarium* spp., *Fusicoccum* spp., *Gaeumannomyces* spp., *Gemmamyces* spp., *Geotrichum* spp., *Gibberella* spp., *Gloeodes* spp., *Gloeosporidiella* spp., *Glomerella* spp., *Gnomonia* spp., *Graphiola* spp., *Guignardia* spp., *Gymnosporangium* spp., *Hainesia* spp., *Hamaspora* spp., *Helicobasidium* spp., *Helminthosporium* spp., *Heterobasidion* spp., *Inonotus* spp., *Kabatiella* spp., *Kabatina* spp., *Lachnella* spp., *Laetiporus* spp., *Leatisaria* spp., *Lasiodiplodia* spp., *Leptographium* spp., *Leptosphaeria* spp., *Leptosphaeruiina* spp., *Lophodermium* spp., *Macrophoma* spp., *Macrophomina* spp., *Magnaporthe* spp., *Marssonina* spp., *Melampsora* spp., *Melampsoridium* spp., *Microsphaera* spp., *Microsphaeropsis* spp., *Monilinia* spp., *Mucor* spp., *Mycocentrospora* spp., *Mycogone* spp., *Mycosphaerella* spp., *Mycovelosiella* spp., *Myrothecium* spp., *Nattrassia* spp., *Nectria* spp., *Oidium* spp., *Oxyporus* spp., *Penicillium* spp., *Peronospora* spp., *Pestalotiopsis* spp., *Pezicula* spp., *Phaeoacremonium* spp., *Phaeoramularia* spp., *Phellinus* spp., *Phialophora* spp., *Phohota* spp., *Phoma* spp., *Phomopsis* spp., *Phragmidium* spp., *Phyllactinia* spp., *Phyllosticta* spp., *Phymatotrichopsis* spp., *Phytophthora* spp., *Pithomyces* spp., *Plasmodiophora* spp., *Plasmopara* spp., *Plectosphaerella* spp., *Plectosporium* spp., *Podisoma* spp., *Podosphaera* spp., *Polymyxa* spp., *Polyporus* spp., *Pseudocercosporella* spp., *Pseudonectria* spp., *Pseudonectria* spp., *Pseudopezicula* spp., *Pseudopeziza* spp., *Puccinia* spp., *Pycnostysanus* spp., *Pyrenochaeta* spp., *Pyrenopeziza* spp., *Pyrenophora* spp., *Pythium* spp., *Pythomyces* spp., *Ramularia* spp., *Rhizoctonia* spp., *Rhizopus* spp., *Rhynchosporium* spp., *Rhytisma* spp., *Roestelia* spp., *Rosellinia* spp., *Scirrhia* spp., *Schizophyllum* spp., *Sclerotinia* spp., *Sclerotium* spp., *Seiridium* spp., *Septocyta* spp., *Septoria* spp., *Serpula* spp., *Setosphaeria* spp., *Sphacelotheca* spp., *Sphaeropsis* spp., *Sphaerotheca* spp., *Spilocaea* spp., *Spongospora* spp., *Stagonospora* spp., *Stemphylium* spp., *Stenocarpella* spp., *Stereum* spp., *Stigmina* spp., *Synchytrium* spp., *Thanathephorus* spp., *Taphrina* spp. *Thyronectria* spp., *Tilletia* spp., *Trametes* spp., *Tranzscheha* spp., *Trechispora* spp., *Truncatella* spp., *Typhula* spp, *Uncinula* spp., *Urobasidium* spp., *Urocystis* spp., *Uromyces* spp., *Ustilago* spp., *Vasa* spp., *Venturia* spp., *Verticillium* spp., *Zygosporium* spp., *Zythia* spp.

The biocidal properties of the solids of the invention find many applications. For instance use of the solids can be in agriculture for crop protection. When used for crop protection, the solid of the invention is usually applied using a wet method of spraying a suspension of the solid of the invention in the amount of water sufficient for spraying the entire leaf area of the crop, usually a volume between 300 and 1,000 liters per hectare, in the same way it is currently performed with conventional salts such as Cu(II) hydroxide [$Cu(OH)_2$], Cu(II) oxychloride [$Cu_2(OH)_3Cl$], tribasic Cu(II) sulfate [$Cu_3(OH)_2.CuSO_4$], and also Cu(I) oxide [$Cu_2O$], with the only difference of including more than 100-fold less Cu(0) in ppm per hectare, with the same or a better result.

The use of the solids of the invention as biocidal agents can also advantageously be in the preservation of food products, in particular of fruits and vegetables, or for the preservation of fodder.

The use of the solids of the invention as biocidal agents can also advantageously be in the protection and preservation of plant seeds. In a particular embodiment, the solid of the invention is employed as a seed coating or seed dressing.

The seed coating or dressing can further comprise a binder. Suitable examples of binders include water-soluble polymers, such as polyvinyl acetate, polyvinyl alcohol, polyvinyl pyrrolidone, polyurethane, methyl cellulose, carboxymethyl cellulose, hydroxylpropyl cellulose, sodium alginate, polyurethane, polyacrylate, casein, gelatin, pullulan, polyacrylamide, polyethylene oxide, polystyrene, styrene acrylic copolymers, styrene butadiene polymers, and poly(N-vinylacetamide). Also waxes such as carnauba wax, paraffin wax, polyethylene wax, bees wax, and polypropylene wax can be used as a binder or as an extra flow additive. Also, ethylene vinyl acetate can suitably be used as a binder.

In any of the above embodiments, the seed coating or dressing can further comprise a wetting and dispersing additive (sometimes also referred to as pigment dispersant). Suitable wetting and dispersing additives include ionic and non-ionic products and include solutions of polyacrylates, organo-modified polyacrylates, sodium polyacrylates, polyurethanes, phosphoric acid esters, star polymers, and/or modified polyethers.

In any of the above embodiments, the coating or dressing can further comprise additives, such a solvent, a thickener, a colouring agent, an anti-foaming agent, a surfactant, an effect pigment, or one or more plant enhancing agents.

Suitable solvents include alcohol, butyl glycol, texanol ((3-hydroxy-2,2,4-trimethyl-pentyl) 2-methylpropanoate) and mixtures thereof. Suitable thickeners include agar, carboxy methylcellulose, carrageen, chitin, fucoidan, ghatti, gum arabic, karaya, laminaran, locust bean gum, pectin, alginate, guar gum, xanthane gum and tragacanth, bentonite clays, HEUR (hydrophobically modified, ethoxylated urethane) thickeners, HASE (hydrophobically modified, alkali-swellable emulsion) thickeners and polyacrylates. Suitable dyes include: anthraquinone, triphenylmethane, phthalocyanine and derivatives thereof, and diazonium salts. Colourants can contain pigments such as pigment red 112 (CAS No. 6535-46-2), pigment red 2 (CAS No. 6041-94-7), pigment red 48:2 (CAS No. 7023-61-2), pigment blue 15:3 (CAS No. 147-14-8), pigment green 36 (CAS No. 14302-13-7), pigment green 7 (CAS No. 1328-53-6), pigment yellow 74 (CAS No. 6358-31-2), pigment orange 5 (CAS No. 3468-63-1), pigment violet 23 (CAS No. 6358-30-1), pigment black 7 (CAS No. 97793-37-8), and pigment white 6 (CAS No. 98084-96-9). Suitable anti-foaming agents include polyethylene glycol, glycerine, mineral oil defoamers, silicone defoamers, non-silicone defoamers (such as polyethers, polyacrylates), dimethylpolysiloxanes (silicone oils), arylalkyd modified polysiloxanes, and polyether siloxane copolymer containing fumed silica. Suitable effect pigments include pearlescent pigment in different particle sizes. Suitable plant enhancing agents as used in this application comprise any component that is in one way or another advantageous for a plant or a plant seed. Examples of plant enhancing agents include insecticidal agents, nematicidal agents, disinfectants, micro-organisms, rodent killer, weed killer (herbicide), attracting agents, repellent agents, plant growth regulators (such as giberillic acid, auxine or cytokine), nutrients (such as potassium nitrate, magnesium sulphate, iron chelate), plant hormones, minerals, plant extracts, acaricides or miticides, molluscicides, germination stimulants, pheromones, biological preparations, chitosan, chitine-based preparations, etc.

In a preferred embodiment, in any of the above embodiments, the seed coating or dressing further comprises a further biocidal agent known to be employed in seed coatings or dressings, such as streptomycin, captan, carboxin, difenoconazole, fludioxonil, imazalil, mefenoxam, petachlorobitrobenzene, tebuconazole, thiabendazole, thiram, triadimenol, chlorpyriphos, diazinon, imidacloprid, lindane, permethrin, cyfluthrin, thiamethoxam, and combinations thereof.

For instance, the solid of the present invention can be used in combination with a product of the Flo-rite series (e.g. 1706, 5330 or 3330 products) commercially available from Badische Anilin- and Soda-Fabrik.

The use of the solids of the invention as biocidal agents can also advantageously be in the preparation of biocidal paints, in particular paints having anti-fouling properties. Pathogen growth, especially fungal growth, is not uncommon on paint applied on surfaces, especially wood surfaces. Common examples of fungal species found on contaminated dry paint film are *Aureobasidium, Alternaria, Aspergillus, Cladosporium* and *Penicillium*. By employing the solid of the invention in paints, pathogenic growth on the paint once applied to surfaces or even in the paint itself before application can be prevented or minimised. In a preferred embodiment, the solid of the invention is employed in paint applied to surfaces exposed to aqueous environments, such as marine vessels.

The use of the solids of the invention as biocidal agents can also advantageously be in the treatment of water, for instance in the treatment of waste water (water that has been adversely affected in quality by anthropogenic influence), water employed in drinks and foodstuffs, pharmaceuticals, chemicals and cosmetics, or in electrical apparatuses (e.g. air conditioners, air filters, humidifiers, ice machines, osmosis apparatuses). Alternatively, the use of the solids of the invention as biocidal agents can also advantageously be in maintaining the quality of water (preventing its contamination with pathogenic agents) in any fluid system, such as industrial systems (chemical, mechanical, and biological processes), filters, evaporative cooling towers, boilers, boiler condensate, pasteurizers, hot water heaters, heat exchangers, steam generators, nuclear power electric systems, combustion engine and diesel coolant systems, evaporator systems, thermal desalination systems, papermaking operations, fermentation processes, cleaning and rinsing water, recycled waste water, ballast water, cruise ship gray water, and the like.

Another use of the invention as biocidal agents can also advantageously be in textiles. The use in textiles advantageously further provides deodorization of the textile. The textile can be or be suitable for a wound dressing, a burn dressing, a sanitary pad, incontinence pad, a tampon, a diaper, toilet paper, a sanitary wipe, a cotton swab, a surgical gown, an isolation gown, a lab coat, a glove, surgical scrubs, a head cover, a hair cover, a face mask, a suture, a floor mat, a lamp handle cover, an exam table cover, a cast liner, a splint liner, padding, gauze, packaging materials, a mattress cover, bedding, a sheet, a towel, clothing, underwear, a curtain, a screen, a tent or a shelter.

In a particular embodiment, the solid of the invention is employed as a powder. In another particular embodiment, the solid of the invention is applied as a suspension or solution which comprises Cu(0) at a concentration of from 1.5 to 100 ppm, preferably from 1.5 to 50 ppm, more preferably from 1.5 to 10 ppm, even more preferably from 1.5 to 5 ppm, yet more preferably from 2.5 to 5 ppm. In a preferred embodiment, the suspension or solution is an aqueous one. Concentration in ppms is calculated as follows:

$$C(\text{ppm}) = 1000000 \times m_{solute}(m_{solution} + m_{solute})$$

wherein the solute is Cu(0).

In a particular embodiment, when employed as fodder, the solid of the invention is applied as a powder or as a suspension, wherein the total concentration of copper (Cu (0), Cu(I) and/or Cu(II)) is 25 ppm or lower, preferably 1.5 to 25 ppm, more particularly 2.5 to 25 ppm.

In another particular embodiment, especially when employed as seed coating or dressing, the solid of the invention is employed as a blend with any of the above mentioned further plant seed coating or dressing agents.

The solid according to the invention can be used in combination with one or more additional biocidal agents, particularly fungicides. In an embodiment, the solid according to the invention is comprised in the same composition as the one or more additional biocidal agents.

In another embodiment, the solid according to the invention and the one or more additional biocidal agents are comprised in separate compositions, and are used at the same or different times (e.g. sequentially).

For example, the additional biocidal agent is a contact or systemic fungicidal agent. Contact fungicides, including, among others, copper salts, act by contact with the plant, seed, or food/fodder material, preventing sporangia from germinating and penetrating the plant cells or seed or food/fodder, so they serve primarily for preventive action. In the case of plants, the fungicide can act systemically. Systemic fungicides penetrate the plant through the leaves or roots and spread throughout the entire plant, being effective further in the treatment of already diseased (infected) plants.

Copper, and therefore also the solids according to the invention, act only on the surface of the plant where it has been deposited, i.e. as contact biocides, and it therefore does not protect the new plant material that is growing. Therefore, in a preferred embodiment, the solid according to the invention is used in combination with one or more systemic biocides, more particularly systemic fungicides. Advantageously, copper primarily reduces the infectious load, and a much lower systemic biocide concentration is therefore required, obtaining a clear additive effect.

Examples of contact fungicides are, in a non-limiting manner, copper compounds (e.g., copper oxychloride), mercury compounds, tin compounds, zinc compounds, other metallic compounds, sulfur and sulfur compounds (e.g., sofril), organophosphate compounds (e.g., pyrazophos), dithiocarbamates (e.g., mancozeb), carbamates (e.g., thiophanate), halogenated hydrocarbons (e.g., chloropicrin), aromatic nitro compounds (e.g., dinitrophenol), quinones (e.g., diatinon), phthalimides (e.g., folpet), chlorophenyls (e.g., chlorothalonil), sulfonamides, quinoxalines, triazines (e.g., anilazine), nitroparaffins (e.g., fenitropan), or fosetyl (e.g., fosetyl aluminum). Examples of systemic fungicides are, in a non-limiting manner, dicarboximides (e.g., procymidone), benzimidazoles (e.g., thiabendazole), triazoles (e.g., tebuconazole), imidazoles (e.g., imazalil), pyrimidines (e.g., fenarimol), piperazines (e.g., triforine), strobilurins (e.g., azoystrobin), guanidines (e.g., dodine), anilinopyrimidines (e.g., cyprodinil), phenylpyrrol es (e.g., fenpiclonil), antibiotics (e.g., kasugamycin), glycerophospholipid synthesis inhibitors (e.g., validamycin A), phenyl carbamates (e.g., diethofencarb), benzamides, phenylamides (e.g., metalaxyl), cymoxanil, propamocarb, or dimethomorph.

EXAMPLES

Dimension sizes measured by SEM mentioned herein were carried out as follows. Samples for measurement were prepared by sprinkling the solid of the invention from an Eppendorf microtube on an adhesive kapton (polyamide compatible with dimensions in ultrahigh vacuum) surface locked onto the sample holder that is introduced into a sputter coater. Powder not adhered to the kapton is eliminated with a nitrogen gun. The samples are then covered with a thin gold layer by sputtering. The sputter coater employed is an Edwards S150B. All samples are subjected to sputtering in the same run and are thus covered with an approximately 5 nm layer of gold.

The samples are then analyzed by SEM employing a FEI Inspect microscope. Images were obtained with a high electron resolution ETD detector. Measurements were carried out under the following conditions: voltage 20 kV; spot 3.0; aperture no 7; Working distance: ~9.2 mm. Images were recorded with a 1024×943 pixel resolution in .jpg format. In order to improve analysis and quantification of the dimensions to be measured, samples were tilted 39 degrees. Several images under different focal magnifications were employed.

Example 1. CuO/Kaolin Material Production [T1]

The material is prepared by means of the method of depositing metal precursors on the solid in several steps. In the first step, 1.003 grams of kaolin and 100 mL of Milli Q water are added in a beaker, and the suspension is left under stirring. Next, 0.0205 grams of sodium dodecyl sulfate (SDS) acting as an anionic surfactant are added, maintaining stirring continuously to obtain a homogeneous suspension of kaolin in water. The pH of the mixture is measured (pH=5.2). In the second step, an aqueous solution of copper prepared with 0.6464 grams of $Cu(NO_3)_2 \cdot 2.5H_2O$ precursor diluted in 15 mL of water (Milli Q) is added to the aqueous suspension prepared in the first step to thereby obtain about 15% by weight of elemental Cu (theoretical value) in the final solid material. The aqueous solution of copper is added dropwise to the aqueous suspension of kaolin. The pH of the mixture is measured (pH=4.5). In the third step, the pH of the aqueous suspension is adjusted to 10.0 by adding an aqueous solution of $Na_2CO_3$ (1M). Subsequently, the aqueous suspension is left for 6 hours under continuous stirring, and the mixture is then left to age for 12 hours. In the fourth step, the mixture is filtered and the recovered solid is washed with Milli Q water until the pH of the filtration liquids reaches a value of 7.0. The solid material is then dried in an oven and an air atmosphere at 60° C. for 24 hours. In the fifth step, the solid material is calcined in a muffle furnace and in an air atmosphere, with a temperature control program for controlling temperatures ranging from room temperature to 550° C. (with a ramp of 3° C./min) and a subsequent isothermal treatment at 550° C. for 3 hours. The resulting solid material (Cu/kaolin) is analyzed by ICP (inductively coupled plasma mass spectroscopy) in order to know its elemental composition, determining that the Cu content is 13.1% by weight. X-ray diffraction measurements taken with an X-ray diffractor indicate that the kaolin structure is present in the material and that Cu is mainly found in the form of CuO after thermal treatment. SEM analysis reveals that the dimensions of the solid are the following: 30 nm±10 nm mean thickness; 400 nm mean size of micro-sized dimensions (some crystals with micro-sized dimensions of as low as 60 nm and as high as 900 nm were observed).

Example 2. Solid Cu/Kaolin Material Production [T2]

The material is prepared from the material prepared as described in Example 1, in which in the fifth step, the solid material is reduced in a quartz reactor and in a hydrogen atmosphere, with a temperature control program for controlling temperatures ranging from room temperature to 450° C. (with a ramp of 10° C./min) and subsequent isothermal treatment at 450° C. for 3 hours. The resulting solid material (Cu/kaolin) is analyzed by ICP in order to know its elemental composition, determining that the Cu content is 13.0% by weight. X-ray diffraction measurements indicate that the kaolin structure is present in the material and that Cu is mainly found in the form of metallic Cu(0) after thermal treatment. SEM analysis reveals that the dimensions of the solid are the following: 30 nm±10 nm mean thickness; 300 nm mean size of micro-sized dimensions (some crystals with micro-sized dimensions of as low as 60 nm and as high as 800 nm were observed).

Example 3. Solid Cu/Kaolin Material (Metallic Cu(0)) Production [T3]

The material is prepared from the material prepared as described in Example 1, in which in the fifth step, the copper oxide deposited on the kaolin is reduced by adding an $NaBH_4$ solution containing at least a molar ratio of 1:4 ($NaBH_4$:Cu) dropwise on the colloidal suspension, under vigorous stirring. It is left to stir for at least 10 minutes and is then filtered, washed with deionized water and subsequently dried in an oven at 60° C.

The resulting solid material (Cu/Kaolin) is analyzed by ICP in order to know its elemental composition, determining that the Cu content is 13.05% by weight. X-ray diffraction measurements indicate that Cu is mainly found in the form of metallic Cu(0). SEM analysis reveals that the dimensions of the solid are the following: 50 nm±10 nm mean thickness; 500 nm mean size of micro-sized dimensions (some crystals with micro-sized dimensions of as low as 100 nm and as high as 1000 nm were observed).

Example 4. Solid CuO—ZnO/Kaolin Material Production [T4]

The material is prepared by means of the method of depositing metal precursors on the solid in several steps. In the first step, 1.003 grams of kaolin and 100 mL of Milli Q water are added in a beaker, and the suspension is left under stirring. Next, 0.0205 grams of sodium dodecyl sulfate (SDS) acting as an anionic surfactant are added, maintaining the stirring continuously to obtain a homogeneous suspension of kaolin in water. The pH of the mixture is measured (pH=5.2). In the second step, an aqueous solution of copper prepared with 0.2746 grams of $Cu(NO_3)_2*2.5H_2O$ precursor diluted in 7 mL of water (Milli Q) is added to the aqueous suspension prepared in the first step to thereby obtain about 7.0% by weight of elemental Cu (theoretical value) in the final solid material. The solution is added dropwise to the aqueous suspension of kaolin. The pH of the mixture is measured (pH=4.5). The aqueous solution of zinc, prepared with 0.2514 g of $Zn(CH_3CHOO)_2*2H_2O$ precursor diluted in 7 mL of water (Milli Q) is then added to thereby obtain 7.0% by weight of elemental Zn (theoretical value) in the final solid material. The solution is added dropwise to the aqueous suspension. The pH of the mixture is measured (pH=5.34). In the third step, the pH of the aqueous suspension is adjusted to 10.0 by adding an aqueous solution of $Na_2CO_3$ (1M). Subsequently, the aqueous suspension is left for 6 hours under continuous stirring, and the mixture is then left to age for 12 hours. In the fourth step, the mixture is filtered and the recovered solid is washed with Milli Q water until the pH of the filtration liquids reaches a value of 7.0. The solid material is then dried in an oven and air atmosphere at 60° C. for 24 hours.

In the fifth step, the solid material is calcined in a muffle furnace and in an air atmosphere, with a temperature control program for controlling temperatures ranging from room temperature to 550° C. (with a ramp of 3° C./min) and a subsequent isothermal treatment at 550° C. for 3 hours. The resulting solid material (CuO—ZnO/kaolin) is analyzed by ICP in order to know its elemental composition, determining that the Cu and Zn contents are 6.7% and 6.5% by weight, respectively. X-ray diffraction measurements indicate that the kaolin structure is present in the material and that both Cu and Zn are mainly found in the form of CuO and ZnO, respectively, after thermal treatment. SEM analysis reveals that the dimensions of the solid are the following: 30 nm±10 nm mean thickness; 300 nm mean size of micro-sized dimensions (some crystals with micro-sized dimensions of as low as 60 nm and as high as 800 nm were observed).

Example 5. Solid Cu—Zn/Kaolin Material Production [T5]

The material is prepared from the material prepared as described in Example 4, in which in the fifth step, the solid material is reduced in a quartz reactor and in a hydrogen atmosphere, with a temperature control program for controlling temperatures ranging from room temperature to 450° C. (with a ramp of 10° C./min) and a subsequent isothermal treatment at 450° C. for 3 hours. The resulting solid material (Cu—Zn/kaolin) is analyzed by ICP in order to know its elemental composition, determining that the Cu and Zn contents are 6.5 and 6.3% by weight, respectively. X-ray diffraction measurements indicate that the kaolin structure is present in the material and that Cu and Zn are mainly found in their metallic Cu(0) and Zn(0) forms after thermal treatment. SEM analysis reveals that the dimensions of the solid are the following: 35 nm±10 nm mean thickness; 300 nm mean size of micro-sized dimensions (some crystals with micro-sized dimensions of as low as 60 nm and as high as 800 nm were observed).

Example 6. CuO/Metakaolin Material Production [T6]

The material is prepared by means of the method of depositing metal precursors on the solid in several steps. In the first step, 1.009 grams of metakaolin and 100 mL of Milli Q water are added in a beaker, and the suspension is left under stirring. Next, 0.0215 grams of sodium dodecyl sulfate (SDS) acting as an anionic surfactant are added, maintaining stirring continuously to obtain a homogeneous suspension of metakaolin in water. The pH of the mixture is measured (pH=5.4). In the second step, an aqueous solution of copper prepared with 0.6504 grams of $Cu(NO_3)_2*2.5H_2O$ precursor diluted in 15 mL of water (Milli Q) is added to the aqueous suspension prepared in the first step to thereby obtain about 15% by weight of elemental Cu (theoretical value) in the final solid material. The aqueous solution of copper is added dropwise to the aqueous suspension of metakaolin. The pH of the mixture is measured (pH=4.7). In the third step, the pH of the aqueous suspension is adjusted to 10.0 by adding an aqueous solution of $Na_2CO_3$ (1M). Subsequently, the aqueous suspension is left for 6 hours under continuous stirring, and the mixture is then left to age for 12 hours. In the fourth step, the mixture is filtered and the recovered solid is washed with Milli Q water until the pH 5 of the filtration liquids reaches a value of 7.0. The solid material is then dried in an oven and an air atmosphere at 60° C. for 24 hours. In the fifth step, the solid material is calcined in a muffle furnace and in an air atmosphere, with a temperature control program for controlling temperatures ranging from room temperature to 550° C. (with a ramp of 3° C./min) and a subsequent isothermal treatment at 550° C. for 3 hours. The resulting solid material (Cu/metakaolin) is analyzed by ICP (inductively coupled plasma mass spectroscopy) in order to know its elemental composition, determining that the Cu content is 12.9% by weight. X-ray diffraction measurements taken with an X-ray diffractor indicate that the metakaolin structure is present in the material and that Cu is mainly found in the form of CuO after thermal treatment. SEM analysis reveals that the dimensions of the solid are the following: 30 nm±10 nm mean thickness; 400 nm mean size of micro-sized dimensions (some crystals with micro-sized dimensions of as low as 60 nm and as high as 900 nm were observed).

Example 7. Cu/Metakaolin Material Production [T7]

The material is prepared from the material prepared as described in Example 6, in which in the fifth step, the solid material (CuO) is reduced in a quartz reactor and in a hydrogen atmosphere, with a temperature control program for controlling temperatures ranging from room temperature to 450° C. (with a ramp of 10° C./min) and subsequent isothermal treatment at 450° C. for 3 hours. The resulting solid material (Cu/metakaolin) is analyzed by ICP in order to know its elemental composition, determining that the Cu content is 13.2% by weight. X-ray diffraction measurements indicate that the kaolin structure is present in the material and that Cu is mainly found in the form of metallic Cu(0) after thermal treatment. SEM analysis reveals that the dimensions of the solid are the following: 30 nm±10 nm mean thickness; 300 nm mean size of micro-sized dimensions (some crystals with micro-sized dimensions of as low as 60 nm and as high as 800 nm were observed).

Example 8. Solid Cu/Metakaolin Material (Metallic Cu(0)) Production [T8]

The material is prepared from the material prepared as described in Example 6, in which in the fifth step, the copper oxide deposited on the metakaolin is reduced by adding an $NaBH_4$ solution containing at least a molar ratio of 1:4 ($NaBH_4$:Cu) dropwise on the colloidal suspension, under vigorous stirring. It is left to stir for at least 10 minutes and is then filtered, washed with deionized water and subsequently dried in an oven at 60° C. The resulting solid material (Cu(0)/metakaolin) is analyzed by ICP in order to know its elemental composition, determining that the Cu content is 13.1% by weight. X-ray diffraction measurements indicate that Cu is mainly found in the form of metallic Cu(0). SEM analysis reveals that the dimensions of the solid are the following: 50 nm±10 nm mean thickness; 500 nm mean size of micro-sized dimensions (some crystals with micro-sized dimensions of as low as 100 nm and as high as 1000 nm were observed).

Example 9. CuO/Talc Material Production [T9]

The material is prepared by means of the method of depositing metal precursors on the solid in several steps. In the first step, 1.012 grams of talc and 100 mL of Milli Q water are added in a beaker, and the suspension is left under stirring. Next, 0.0201 grams of sodium dodecyl sulfate (SDS) acting as an anionic surfactant are added, maintaining stirring continuously to obtain a homogeneous suspension of talc in water. The pH of the mixture is measured (pH=5.4). In the second step, an aqueous solution of copper prepared with 0.6391 grams of $Cu(NO3)2*2.5H_2O$ precursor diluted in 15 mL of water (Milli Q) is added to the aqueous suspension prepared in the first step to thereby obtain about 15% by weight of elemental Cu (theoretical value) in the final solid material. The aqueous solution of copper is added dropwise to the aqueous suspension of talc. The pH of the mixture is measured (pH=4.8). In the third step, the pH of the aqueous suspension is adjusted to 10.0 by adding an aqueous solution of $Na_2CO_3$ (1M). Subsequently, the aqueous suspension is left for 6 hours under continuous stirring, and the mixture is then left to age for 12 hours. In the fourth step, the mixture is filtered and the recovered solid is washed with Milli Q water until the pH 5 of the filtration liquids reaches a value of 7.0. The solid material is then dried in an oven and an air atmosphere at 60° C. for 24 hours. In the fifth step, the solid material is calcined in a muffle furnace and in an air atmosphere, with a temperature control program for controlling temperatures ranging from room temperature to 550° C. (with a ramp of 3° C./min) and a subsequent isothermal 10 treatment at 550° C. for 3 hours. The resulting solid material (Cu/talc) is analyzed by ICP (inductively coupled plasma mass spectroscopy) in order to know its elemental composition, determining that the Cu content is 13.2% by weight. X-ray diffraction measurements taken with an X-ray diffractor indicate that the talc structure is present in the material and that Cu is mainly found in the form of CuO after thermal treatment. SEM analysis reveals that the dimensions of the solid are the following: 35 nm±10 nm mean thickness; 450 nm mean size of micro-sized dimensions (some crystals with micro-sized dimensions of as low as 60 nm and as high as 900 nm were observed).

Example 10. Cu/Talc Material Production [T10]

The material is prepared from the material prepared as described in Example 9, in which in the fifth step, the solid material (CuO) is reduced in a quartz reactor and in a hydrogen atmosphere, with a temperature control program for controlling temperatures ranging from room temperature to 450° C. (with a ramp of 10° C./min) and subsequent isothermal treatment at 450° C. for 3 hours. The resulting solid material (Cu/Talc) is analyzed by ICP in order to know its elemental composition, determining that the Cu content is 12.8% by weight. X-ray diffraction measurements indicate that the talc structure is present in the material and that Cu is mainly found in the form of metallic Cu(0) after thermal treatment. SEM analysis reveals that the dimensions of the solid are the following: 40 nm±10 nm mean thickness; 400 nm mean size of micro-sized dimensions (some crystals with micro-sized dimensions of as low as 50 nm and as high as 800 nm were observed).

Example 11. Solid Cu/Talc Material (Metallic Cu(0)) Production [T11]

The material is prepared from the material prepared as described in Example 9, in which in the fifth step, the copper oxide deposited on the talc is reduced by adding an $NaBH_4$ solution containing at least a molar ratio of 1:4 ($NaBH_4$:Cu) dropwise on the colloidal suspension, under vigorous stirring. It is left to stir for at least 10 minutes and is then filtered, washed with deionized water and subsequently dried in an oven at 60° C. The resulting solid material (Cu(0)/Talc) is analyzed by ICP in order to know its elemental composition, determining that the Cu content is 12.9% by weight. X-ray diffraction measurements indicate that Cu is mainly found in the form of metallic Cu(0). SEM analysis reveals that the dimensions of the solid are the following: 40 nm±10 nm mean thickness; 550 nm mean size of micro-sized dimensions (some crystals with micro-sized dimensions of as low as 90 nm and as high as 950 nm were observed).

Example 12. CuO/Montmorillonite Material Production [T12]

The material is prepared by means of the method of depositing metal precursors on the solid in several steps. In the first step, 0.997 grams of montmorillonite and 100 mL of Milli Q water are added in a beaker, and the suspension is left under stirring. Next, 0.0211 grams of sodium dodecyl sulfate (SDS) acting as an anionic surfactant are added, maintaining stirring continuously to obtain a homogeneous suspension of montmorillonite in water. The pH of the mixture is measured (pH=4.1). In the second step, an aqueous solution of copper prepared with 0.6421 grams of $Cu(NO3)2*2.5H_2O$ precursor diluted in 15 mL of water (Milli Q) is added to the aqueous suspension prepared in the first step to thereby obtain about 15% by weight of elemental Cu (theoretical value) in the final solid material. The aqueous solution of copper is added dropwise to the aqueous suspension of montmorillonite. The pH of the mixture is measured (pH=4.3). In the third step, the pH of the aqueous suspension is adjusted to 10.0 by adding an aqueous solution of $Na_2CO_3$ (1M). Subsequently, the aqueous suspension is left for 6 hours under continuous stirring, and the mixture is then left to age for 12 hours. In the fourth step, the mixture is filtered and the recovered solid is washed with Milli Q water until the pH 5 of the filtration liquids reaches a value of 7.0. The solid material is then dried in an oven and an air atmosphere at 60° C. for 24 hours. In the fifth step, the solid material is calcined in a muffle furnace and in an air atmosphere, with a temperature control program for controlling temperatures ranging from room temperature to 550° C. (with a ramp of 3° C./min) and a subsequent isothermal treatment at 550° C. for 3 hours. The resulting solid material (Cu/montmorillonite) is analyzed by ICP (inductively coupled Plasma mass spectroscopy) in order to know its elemental composition, determining that the Cu content is 13.0% by weight. X-ray diffraction measurements taken with an X-ray diffractor indicate that the montmorillonite structure is present in the material and that Cu is mainly found in the form of CuO after thermal treatment. SEM analysis reveals that the dimensions of the solid are the following: 30 nm±10 nm mean thickness; 500 nm mean size of micro-sized dimensions (some crystals with micro-sized dimensions of as low as 70 nm and as high as 950 nm were observed).

Example 13. Cu/Montmorillonite Material Production [T13]

The material is prepared from the material prepared as described in Example 12, in which in the fifth step, the solid material (CuO) is reduced in a quartz reactor and in a hydrogen atmosphere, with a temperature control program for controlling temperatures ranging from room temperature to 450° C. (with a ramp of 10° C./min) and subsequent isothermal treatment at 450° C. for 3 hours. The resulting solid material (Cu/Montmorillonite) is analyzed by ICP in order to know its elemental composition, determining that the Cu content is 13.4% by weight. X-ray diffraction measurements indicate that the montmorillonite structure is present in the material and that Cu is mainly found in the form of metallic Cu(0) after thermal treatment. SEM analysis reveals that the dimensions of the solid are the following: 30 nm±10 nm mean thickness; 300 nm mean size of micro-sized dimensions (some crystals with micro-sized dimensions of as low as 60 nm and as high as 800 nm were observed).

Example 14. Solid Cu/Montmorillonite Material (Metallic Cu(0)) Production [T14]

The material is prepared from the material prepared as described in Example 9, in which in the fifth step, the copper oxide deposited on the montmorillonite is reduced by adding an $NaBH_4$ solution containing at least a molar ratio of 1:4 ($NaBH_4$:Cu) dropwise on the colloidal suspension, under vigorous stirring. It is left to stir for at least 10 minutes and is then filtered, washed with deionized water and subsequently dried in an oven at 60° C. The resulting solid material (Cu(0)/Montmorillonite) is analyzed by ICP in order to know its elemental composition, determining that the Cu content is 13.1% by weight. X-ray diffraction measurements indicate that Cu is mainly found in the form of metallic Cu(0). SEM analysis reveals that the dimensions of the solid are the following: 60 nm 10 nm mean thickness; 600 nm mean size of micro-sized dimensions (some crystals with micro-sized dimensions of as low as 100 nm and as high as 900 nm were observed).

Example 15. Biocidal Activity Tests

Contact fungicide response dosage determination, response dosage being understood as the minimum effective dosage, in the control of potato mildew caused by *Phytophtora infestans* under controlled light, temperature and humidity conditions.

The products resulting from Examples 2 and 5, (T2 and T5), with a percentage metal content by weight of 13% copper for T2 and 6.5% copper and 6.3% zinc for T5. The Cu(II) product Cuproflow 38% w/v in the form of oxychloride (Isagro s.p.a) is used as a positive control.

The three products are tested on detached potato leaflet at four different dosages, and one of said four dosages is identified as the minimum effective dosage, i.e., the lowest tested dosage that inhibits infection in all the inoculated leaflets.

This example is carried out according to a randomized complete block design with 3 repetitions. Each repetition consisted of 4 inoculated and treated leaflets. Each product was applied on twelve leaflets in which mycelium expression and necrotic spots caused by *P. infestans* infection were assessed. The test was carried out in hermetically sealed plastic trays under controlled light, temperature and humidity conditions (18 h of light at 21° C.).

The products were applied 24 hours before fungus inoculation, one drop of 20 μL of product at the study concentration was applied on the underside of each leaflet distributed on a 2 $cm^2$ surface. The dosages are in ppm of copper in the solution containing the product to be applied. These amounts roughly correspond to a broth volume of 1,000 L applied per hectare of crop, and the ppm described would correspond to the actual copper concentration in the broth to be applied per hectare.

TABLE 1

| Dosage (ppm copper) | | | | |
|---|---|---|---|---|
| Product | Dosage (ppm) | D/2 | D/4 | D/8 |
| T2 | 20 | 10 | 5 | 2.5 |
| T5 | 10 | 5 | 2.5 | 1.25 |
| CP | 400 | 200 | 100 | 50 |

Inoculation was performed 24 hours after antifungal treatment by placing a drop of 40 μL of an aqueous suspension containing at least 15,000 zoosporangia/ml on the area of the previously treated underside.

The determination of the effectiveness was evaluated by expert visual observation for the number of leaflets with necrotic spots and signs of infection. This determination was performed starting 3 days after inoculation and ending 16 days later.

The control leaflets were all infected 3 days after inoculation, *P. infestans* being confirmed using light microscope. After 10 days, symptoms of leaflet deterioration that cannot be attributed to *P. infestans* were observed, and after 16 days all the leaflets were infected. The greatest differences were observed between days 6 and 8 after inoculation.

TABLE 2

| Antifungal effectiveness after 6 days | | | | |
|---|---|---|---|---|
| Product | Effectiveness D1 (%) | Effectiveness D/2 | Effectiveness D/4 | Effectiveness D/4 |
| T2 | 100 | 100 | 100 | 100 |
| T5 | 100 | 100 | 100 | 91 |
| CP | 100 | 100 | 83 | 75 |

TABLE 3

| | Antifungal effectiveness after 8 days | | | |
|---|---|---|---|---|
| Product | Effectiveness D1 (%) | Effectiveness D/2 | Effectiveness D/4 | Effectiveness D/8 |
| T2 | 100 | 100 | 100 | 100 |
| T5 | 100 | 100 | 88 | 73 |
| CP | 100 | 75 | 66 | 58 |

Antifungal effectiveness (%)=(1−Nt/Nc)×100
Nt: no. of infected leaflets in evaluated product
Nc: n. of infected leaflets in control (water)
Minimum effective dosage: The minimum dosage out of all dosages tested (see Table 1) which kept the leaflets infection free up to 8 days following the application of treatment.

| | |
|---|---|
| T2 | 2.5 ppm |
| T5 | 5 ppm |
| Cuproflow | 400 ppm |

The solids according to the present invention have surprising effectiveness with respect to conventional copper products such as Cu(II) hydroxide [Cu(OH)$_2$], Cu(II) oxychloride [Cu$_2$(OH)$_3$Cl], tribasic Cu(II) sulfate [Cu$_3$(OH)$_2$—CuSO$_4$], and also Cu(I) oxide [Cu$_2$O], which allows reducing copper dosages by more than 100-fold without affecting the effectiveness, with the huge economic and environmental importance this represents. It represents a change from 400 g of copper per hectare of crop to 2.5 g. If the current limit is 750 g of copper a year, it represents the possibility of going from performing treatment twice a year to performing treatment virtually every 2 days which for a contact fungicide such as copper means increasing its effectiveness exponentially in a safe and sustainable manner.

Phytotoxicity of the products was also tested. Similar experiments as for effectiveness studies described above were carried out, only without performing zoosporangium inoculation.

A suspension of the solid of the invention T2 obtained in Example 2 was prepared, the copper concentration in the suspension being 2.5 ppm, which corresponds to the minimum effective dose as determined above. 20 μL of the suspension were applied on leaflet epidermis. The experiment was carried out four times (nM12, nM22, nM32, nM42; nM=nano-micro).

A solid was prepared following the procedure of Example 2, but employing fully nano-sized Kaolin (T2N). Again, 20 μL of the suspension were applied on the leaflet epidermis. The experiment was carried out four times (nn12, nn22, nn32, nn42; nn=nano-nano).

20 μL of acetic acid (10%), the phytotoxicity of which is known, were applied to leaflet epidermis as a control.

Leaflets were inspected to determine the degree of phytotoxicity:

| Phytotoxicity degree | % of leaflet affected |
|---|---|
| 0 | None noticed |
| 1 | 0-10% |
| 2 | 10-50% |
| 3 | 50-75% |
| 4 | >75% |

Results were as follows:

| Run | Product | Dosage (ppm) | Phytotoxicity degree |
|---|---|---|---|
| nM12 | T2 | 2.5 | 0 |
| nM22 | T2 | 2.5 | 0 |
| nM32 | T2 | 2.5 | 0 |
| nM42 | T2 | 2.5 | 0 |
| nn12 | T2N | 2.5 | 2 |
| nn22 | T2N | 2.5 | 2 |
| nn32 | T2N | 2.5 | 2 |
| nn42 | T2N | 2.5 | 2 |
| C | Acetic acid 10% | | 3 |

The results prove that the solids of the invention are non-phytotoxic, as opposed to a solid wherein the support is fully nano-dimensioned.

A suspension of the solid of the invention T5 obtained in Example 5 was prepared, the copper concentration in the suspension being 5 ppm, which corresponds to the minimum effective dose as determined above. 20 μL of the suspension were applied on leaflet epidermis. The experiment was carried out four times (nM15, nM25, nM35, nM45; nM=nano-micro).

A solid was prepared following the procedure of Example 5, but employing fully nano-sized Kaolin (T5N). Again, 20 μL of the suspension were applied on the leaflet epidermis. The experiment was carried out four times (nn15, nn25, nn35, nn45; nn=nano-nano).

20 μL of acetic acid (10%), the phytotoxicity of which is known, were applied to leaflet epidermis as a control.

Leaflets were inspected to determine the degree of phytotoxicity:

Results were as follows:

| Run | Product | Dosage (ppm) | Phytotoxicity degree |
|---|---|---|---|
| nM15 | T5 | 5.0 | 0 |
| nM25 | T5 | 5.0 | 0 |
| nM35 | T5 | 5.0 | 0 |
| nM45 | T5 | 5.0 | 0 |
| nn15 | T5N | 5.0 | 2 |
| nn25 | T5N | 5.0 | 2 |
| nn35 | T5N | 5.0 | 2 |
| nn45 | T5N | 5.0 | 2 |
| C | Acetic acid 10% | | 3 |

The results prove that the solids of the invention are non-phytotoxic, as opposed to a solid wherein the support is fully nano-dimensioned.

Example 16. Biocidal Activity Tests

Contact fungicide response dosage determination, response dosage being understood as the minimum effective dosage, in the control of potato mildew caused by *Phytophtora infestans* under controlled light, temperature and humidity conditions.

The products resulting from Examples 7 and 8, (T7 and T8), with a percentage metal content by weight of 13.2% copper for T7 and 13.1% copper for T8. The Cu(II) product Cuproflow 38% w/v in the form of oxychloride (Isagro s.p.a) is used as a positive control.

The three products are tested on detached potato leaflet at four different dosages, and one of said four dosages is identified as the minimum effective dosage, i.e., the lowest tested dosage that inhibits infection in all the inoculated leaflets.

This example is carried out as in Example 15.

TABLE 1

| | Dosage (ppm copper) | | | |
|---|---|---|---|---|
| Product | Dosage (ppm) | D/2 | D/4 | D/8 |
| T7 | 20 | 10 | 5 | 2.5 |
| T8 | 20 | 10 | 5 | 2.5 |
| CP | 400 | 200 | 100 | 50 |

Inoculation was performed 24 hours after antifungal treatment by placing a drop of 40 μL of an aqueous suspension containing at least 15,000 zoosporangia/ml on the area of the previously treated underside.

The determination of the effectiveness was evaluated by expert visual observation for the number of leaflets with necrotic spots and signs of infection. This determination was performed starting 3 days after inoculation and ending 16 days later.

The control leaflets were all infected 3 days after inoculation, P. infestans being confirmed using light microscope. After 10 days, symptoms of leaflet deterioration that cannot be attributed to P. infestans were observed, and after 16 days all the leaflets were infected. The greatest differences were observed between days 6 and 8 after inoculation.

TABLE 2

| | Antifungal effectiveness after 6 days | | | |
|---|---|---|---|---|
| Product | Effectiveness D1 (%) | Effectiveness D/2 | Effectiveness D/4 | Effectiveness D/8 |
| T7 | 100 | 100 | 100 | 100 |
| T8 | 100 | 100 | 100 | 100 |
| CP | 100 | 90 | 79 | 72 |

TABLE 3

| | Antifungal effectiveness after 8 days | | | |
|---|---|---|---|---|
| Product | Effectiveness D1 (%) | Effectiveness D/2 | Effectiveness D/4 | Effectiveness D/8 |
| T7 | 100 | 100 | 100 | 100 |
| T8 | 100 | 100 | 100 | 100 |
| CP | 100 | 70 | 64 | 59 |

Antifungal effectiveness (%)=(1−Nt/Nc)×100
Nt: no. of infected leaflets in evaluated product
Nc: n. of infected leaflets in control (water)
Minimum effective dosage: The minimum dosage out of all dosages tested (see Table 1) which kept the leaflets infection free up to 8 days following the application of treatment.

| T7 | 2.5 ppm |
|---|---|
| T8 | 2.5 ppm |
| Cuproflow | 400 ppm |

The solids according to the present invention have surprising effectiveness with respect to conventional copper products such as Cu(II) hydroxide [$Cu(OH)_2$], Cu(II) oxychloride [$Cu_2(OH)_3Cl$], tribasic Cu(II) sulfate [$Cu_3(OH)_2$—$CuSO_4$], and also Cu(I) oxide [$Cu_2O$], which allows reducing copper dosages by more than 100-fold without affecting the effectiveness, with the huge economic and environmental importance this represents. It represents a change from 400 g of copper per hectare of crop to 2.5 g. If the current limit is 750 g of copper a year, it represents the possibility of going from performing treatment twice a year to performing treatment virtually every 2 days which for a contact fungicide such as copper means increasing its effectiveness exponentially in a safe and sustainable manner.

Phytotoxicity of the products was also tested. Similar experiments as for effectiveness studies described above were carried out, only without performing zoosporangium inoculation. A suspension of the solid of the invention T7 obtained in Example 7 was prepared, the copper concentration in the suspension being 2.5 ppm, which corresponds to the minimum effective dose as determined above. 20 μL of the suspension were applied on leaflet epidermis. The experiment was carried out four times (nM17, nM27, nM37, nM47; nM=nano-micro).

A solid was prepared following the procedure of Example 7, but employing fully nano-sized Metakaolin (T7N). Again, 20 μL of the suspension were applied on the leaflet epidermis. The experiment was carried out four times (nn17, nn27, nn37, nn47; nn=nano-nano).

20 μL of acetic acid (10%), the phytotoxicity of which is known, were applied to leaflet epidermis as a control.

Leaflets were inspected to determine the degree of phytotoxicity according to the same scale as in Example 15. Results were as follows:

| Run | Product | Dosage (ppm) | Phytotoxicity degree |
|---|---|---|---|
| nM17 | T7 | 2.5 | 0 |
| nM27 | T7 | 2.5 | 0 |
| nM37 | T7 | 2.5 | 0 |
| nM47 | T7 | 2.5 | 0 |
| nn17 | T7N | 2.5 | 2 |
| nn27 | T7N | 2.5 | 2 |
| nn37 | T7N | 2.5 | 2 |
| nn47 | T7N | 2.5 | 2 |
| C | Acetic acid 10% | | 3 |

The results prove that the solids of the invention are non-phytotoxic, as opposed to a solid wherein the support is fully nano-dimensioned.

A suspension of the solid of the invention T8 obtained in Example 8 was prepared, the copper concentration in the suspension being 2.5 ppm, which corresponds to the minimum effective dose as determined above. 20 μL of the suspension were applied on leaflet epidermis. The experiment was carried out four times (nM18, nM28, nM38, nM48; nM=nano-micro).

A solid was prepared following the procedure of Example 8, but employing fully nano-sized Metakaolin (T8N). Again, 20 μL of the suspension were applied on the leaflet epidermis. The experiment was carried out four times (nn18, nn28, nn38, nn48; nn=nano-nano).

20 μL of acetic acid (10%), the phytotoxicity of which is known, were applied to leaflet epidermis as a control.

Leaflets were inspected to determine the degree of phytotoxicity according to the same scale as in Example 15. Results were as follows:

| Run | Product | Dosage (ppm) | Phytotoxicity degree |
| --- | --- | --- | --- |
| nM18 | T8 | 2.5 | 0 |
| nM28 | T8 | 2.5 | 0 |
| nM38 | T8 | 2.5 | 0 |
| nM48 | T8 | 2.5 | 0 |
| nn18 | T8N | 2.5 | 2 |
| nn28 | T8N | 2.5 | 2 |
| nn38 | T8N | 2.5 | 2 |
| nn48 | T8N | 2.5 | 2 |
| C | Acetic acid 10% | | 3 |

The results prove that the solids of the invention are non-phytotoxic, as opposed to a solid wherein the support is fully nano-dimensioned.

Example 17. Biocidal Activity Tests

Contact fungicide response dosage determination, response dosage being understood as the minimum effective dosage, in the control of potato mildew caused by *Phytophtora infestans* under controlled light, temperature and humidity conditions.

The products resulting from Examples 10 and 11, (T10 and T11), with a percentage metal content by weight of 12.8% copper for T10 and 12.9% copper for T11. The Cu(II) product Cuproflow 38% w/v in the form of oxychloride (Isagro s.p.a) is used as a positive control.

The three products are tested on detached potato leaflet at four different dosages, and one of said four dosages is identified as the minimum effective dosage, i.e., the lowest tested dosage that inhibits infection in all the inoculated leaflets.

This example is carried out as in Example 15.

TABLE 1

| Dosage (ppm copper) | | | | |
|---|---|---|---|---|
| Product | Dosage (ppm) | D/2 | D/4 | D/8 |
| T10 | 20 | 10 | 5 | 2.5 |
| T11 | 20 | 10 | 5 | 2.5 |
| CP | 400 | 200 | 100 | 50 |

Inoculation was performed 24 hours after antifungal treatment by placing a drop of 40 μL of an aqueous suspension containing at least 15,000 zoosporangia/ml on the area of the previously treated underside.

The determination of the effectiveness was evaluated by expert visual observation for the number of leaflets with necrotic spots and signs of infection. This determination was performed starting 3 days after inoculation and ending 16 days later.

The control leaflets were all infected 3 days after inoculation, *P. infestans* being confirmed using light microscope. After 10 days, symptoms of leaflet deterioration that cannot be attributed to *P. infestans* were observed, and after 16 days all the leaflets were infected. The greatest differences were observed between days 6 and 8 after inoculation.

TABLE 2

| Antifungal effectiveness after 6 days | | | | |
|---|---|---|---|---|
| Product | Effectiveness D1 (%) | Effectiveness D/2 | Effectiveness D/4 | Effectiveness D/8 |
| T10 | 100 | 100 | 100 | 100 |
| T11 | 100 | 100 | 100 | 100 |
| CP | 100 | 100 | 82 | 70 |

TABLE 3

| Antifungal effectiveness after 8 days | | | | |
|---|---|---|---|---|
| Product | Effectiveness D1 (%) | Effectiveness D/2 | Effectiveness D/4 | Effectiveness D/8 |
| T10 | 100 | 100 | 100 | 100 |
| T11 | 100 | 100 | 100 | 100 |
| CP | 100 | 67 | 61 | 55 |

Antifungal effectiveness (%)=(1−Nt/Nc)×100
Nt: no. of infected leaflets in evaluated product
Nc: n. of infected leaflets in control (water)

Minimum effective dosage: The minimum dosage out of all dosages tested (see Table 1) which kept the leaflets infection free up to 8 days following the application of treatment.

| | |
|---|---|
| T10 | 2.5 ppm |
| T11 | 2.5 ppm |
| Cuproflow | 400 ppm |

The solids according to the present invention have surprising effectiveness with respect to conventional copper products such as Cu(II) hydroxide [$Cu(OH)_2$], Cu(II) oxychloride [$Cu_2(OH)_3Cl$], tribasic Cu(II) sulfate [$Cu_3(OH)_2$—$CuSO_4$], and also Cu(I) oxide [$Cu_2O$], which allows reducing copper dosages by more than 100-fold without affecting the effectiveness, with the huge economic and environmental importance this represents. It represents a change from 400 g of copper per hectare of crop to 2.5 g. If the current limit is 750 g of copper a year, it represents the possibility of going from performing treatment twice a year to performing treatment virtually every 2 days which for a contact fungicide such as copper means increasing its effectiveness exponentially in a safe and sustainable manner.

Phytotoxicity of the products was also tested. Similar experiments as for effectiveness studies described above were carried out, only without performing zoosporangium inoculation. A suspension of the solid of the invention T10 obtained in Example 10 was prepared, the copper concentration in the suspension being 2.5 ppm, which corresponds to the minimum effective dose as determined above. 20 μL of the suspension were applied on leaflet epidermis. The experiment was carried out four times (nM110, nM210, nM310, nM410; nM=nano-micro).

A solid was prepared following the procedure of Example 10, but employing fully nano-sized Talc (T10N). Again, 20 μL of the suspension were applied on the leaflet epidermis. The experiment was carried out four times (nn110, nn210, nn310, nn410; nn=nano-nano).

20 μL of acetic acid (10%), the phytotoxicity of which is known, were applied to leaflet epidermis as a control.

Leaflets were inspected to determine the degree of phytotoxicity according to the same scale as in Example 15. Results were as follows:

| Run | Product | Dosage (ppm) | Phytotoxicity degree |
|---|---|---|---|
| nM110 | T10 | 2.5 | 0 |
| nM210 | T10 | 2.5 | 0 |
| nM310 | T10 | 2.5 | 0 |
| nM410 | T10 | 2.5 | 0 |
| nn110 | T10N | 2.5 | 2 |
| nn210 | T10N | 2.5 | 3 |
| nn310 | T10N | 2.5 | 2 |
| nn410 | T10N | 2.5 | 2 |
| C | Acetic acid 10% | | 3 |

The results prove that the solids of the invention are non-phytotoxic, as opposed to a solid wherein the support is fully nano-dimensioned.

A suspension of the solid of the invention T11 obtained in Example 11 was prepared, the copper concentration in the suspension being 2.5 ppm, which corresponds to the minimum effective dose as determined above. 20 μL of the suspension were applied on leaflet epidermis. The experiment was carried out four times (nM111, nM211, nM311, nM411; nM=nano-micro).

A solid was prepared following the procedure of Example 11, but employing fully nano-sized Talc (T11N). Again, 20 μL of the suspension were applied on the leaflet epidermis. The experiment was carried out four times (nn111, nn211, nn311, nn411; nn=nano-nano).

20 μL of acetic acid (10%), the phytotoxicity of which is known, were applied to leaflet epidermis as a control.

Leaflets were inspected to determine the degree of phytotoxicity according to the same scale as in Example 15. Results were as follows:

| Run | Product | Dosage (ppm) | Phytotoxicity degree |
|---|---|---|---|
| nM111 | T11 | 2.5 | 0 |
| nM211 | T11 | 2.5 | 0 |
| nM311 | T11 | 2.5 | 0 |
| nM411 | T11 | 2.5 | 0 |
| nn111 | T11N | 2.5 | 2 |
| nn211 | T11N | 2.5 | 3 |
| nn311 | T11N | 2.5 | 2 |
| nn411 | T11N | 2.5 | 2 |
| C | Acetic acid 10% | | 3 |

The results prove that the solids of the invention are non-phytotoxic, as opposed to a solid wherein the support is fully nano-dimensioned.

Example 18. Biocidal Activity Tests

Contact fungicide response dosage determination, response dosage being understood as the minimum effective dosage, in the control of potato mildew caused by *Phytophtora infestans* under controlled light, temperature and humidity conditions.

The product resulting 14, (T14), with a percentage metal content by weight of 13.1% copper. The Cu(II) product Cuproflow 38% w/v in the form of oxychloride (Isagro s.p.a) is used as a positive control.

The two products are tested on detached potato leaflet at four different dosages, and one of said four dosages is identified as the minimum effective dosage, i.e., the lowest tested dosage that inhibits infection in all the inoculated leaflets.

This example is carried out as in Example 15.

TABLE 1

| | Dosage (ppm copper) | | | |
|---|---|---|---|---|
| Product | Dosage (ppm) | D/2 | D/4 | D/8 |
| T14 | 20 | 10 | 5 | 2.5 |
| CP | 400 | 200 | 100 | 50 |

Inoculation was performed 24 hours after antifungal treatment by placing a drop of 40 μL of an aqueous suspension containing at least 15,000 zoosporangia/ml on the area of the previously treated underside.

The determination of the effectiveness was evaluated by expert visual observation for the number of leaflets with necrotic spots and signs of infection. This determination was performed starting 3 days after inoculation and ending 16 days later.

The control leaflets were all infected 3 days after inoculation, *P. infestans* being confirmed using light microscope. After 10 days, symptoms of leaflet deterioration that cannot be attributed to *P. infestans* were observed, and after 16 days all the leaflets were infected. The greatest differences were observed between days 6 and 8 after inoculation.

TABLE 2

| | Antifungal effectiveness after 6 days | | | |
|---|---|---|---|---|
| Product | Effectiveness D1 (%) | Effectiveness D/2 | Effectiveness D/4 | Effectiveness D/8 |
| T14 | 100 | 100 | 100 | 100 |
| CP | 100 | 100 | 86 | 77 |

TABLE 3

| | Antifungal effectiveness after 8 days | | | |
|---|---|---|---|---|
| Product | Effectiveness D1 (%) | Effectiveness D/2 | Effectiveness D/4 | Effectiveness D/8 |
| T14 | 100 | 100 | 100 | 100 |
| CP | 100 | 74 | 68 | 60 |

Antifungal effectiveness (%)=(1−Nt/Nc)×100
Nt: no. of infected leaflets in evaluated product
Nc: n. of infected leaflets in control (water)

Minimum effective dosage: The minimum dosage out of all dosages tested (see Table 1) which kept the leaflets infection free up to 8 days following the application of treatment.

| T14 | 2.5 ppm |
|---|---|
| Cuproflow | 400 ppm |

The solids according to the present invention have surprising effectiveness with respect to conventional copper products such as Cu(II) hydroxide [$Cu(OH)_2$], Cu(II) oxychloride [$Cu_2(OH)_3Cl$], tribasic Cu(II) sulfate [$Cu_3(OH)_2$—$CuSO_4$], and also Cu(I) oxide [$Cu_2O$], which allows reducing copper dosages by more than 100-fold without affecting the effectiveness, with the huge economic and environmental importance this represents. It represents a change from 400 g of copper per hectare of crop to 2.5 g. If the current limit is 750 g of copper a year, it represents the possibility of going from performing treatment twice a year to performing treatment virtually every 2 days which for a contact fungicide such as copper means increasing its effectiveness exponentially in a safe and sustainable manner.

Phytotoxicity of the products was also tested. Similar experiments as for effectiveness studies described above were carried out, only without performing zoosporangium inoculation. A suspension of the solid of the invention T14 obtained in Example 14 was prepared, the copper concentration in the suspension being 2.5 ppm, which corresponds to the minimum effective dose as determined above. 20 μL of the suspension were applied on leaflet epidermis. The experiment was carried out four times (nM114, nM214, nM314, nM414; nM=nano-micro).

A solid was prepared following the procedure of Example 14, but employing fully nano-sized Montmorillonite (T14N). Again, 20 μL of the suspension were applied on the leaflet epidermis. The experiment was carried out four times (nn114, nn214, nn314, nn414; nn=nano-nano).

20 μL of acetic acid (10%), the phytotoxicity of which is known, were applied to leaflet epidermis as a control.

Leaflets were inspected to determine the degree of phytotoxicity according to the same scale as in Example 15. Results were as follows:

| Run | Product | Dosage (ppm) | Phytotoxicity degree |
|---|---|---|---|
| nM114 | T14 | 2.5 | 0 |
| nM214 | T14 | 2.5 | 0 |
| nM314 | T14 | 2.5 | 0 |
| nM414 | T14 | 2.5 | 0 |
| nn114 | T14N | 2.5 | 2 |
| nn214 | T14N | 2.5 | 2 |
| nn314 | T14N | 2.5 | 2 |
| nn414 | T14N | 2.5 | 2 |
| C | Acetic acid 10% | | 3 |

The results prove that the solids of the invention are non-phytotoxic, as opposed to a solid wherein the support is fully nano-dimensioned.

The invention claimed is:

1. A solid comprising particles which comprise Cu(0) nanoparticles deposited on a phyllosilicate, wherein the particles have
    (i) a nanometric dimension;
    (ii) a first micro-sized dimension; and
    (iii) a second micro-sized dimension;
        wherein a mean size of the nanometric dimension is 100 nm or lower;
        wherein a mean size of the first micro-sized dimension is between 200 and 1000 nm;
        wherein a mean size of the second micro-sized dimension is between 200 and 1000 nm; and
        wherein the first micro-sized dimension and the second micro-sized dimension are perpendicular.

2. The solid according to claim 1, wherein the particles further comprise nanoparticles of copper (I) oxide and/or copper (II) oxide deposited on the phyllosilicate.

3. The solid according to claim 2, wherein a molar ratio of the Cu(0) nanoparticles to a sum of the copper (I) oxide and the copper (II) oxide nanoparticles deposited on the phyllosilicate is higher than 10:1.

4. A solid comprising particles which comprise Cu(0) nanoparticles deposited on a phyllosilicate, wherein the particles have
    (iv) a nanometric dimension;
    (v) a first micro-sized dimension; and
    (vi) a second micro-sized dimension;
        wherein a mean size of the nanometric dimension is 100 nm or lower;
        wherein a mean size of the first micro-sized dimension is between 200 and 1000 nm;
        wherein a mean size of the second micro-sized dimension is between 200 and 1000 nm; and
        wherein the first micro-sized dimension and the second micro-sized dimension are perpendicular,
        wherein the particles further comprise Zn(0) nanoparticles and/or Zn(II) nanoparticles deposited on the phyllosilicate.

5. The solid according to claim 1, wherein the particles further comprise nanoparticles of Ti, Sn, Zr, Fe, Co, Ni, V, Mo, W, Ce, La, Ga, Au or Ag, or combinations thereof, deposited on the phyllosilicate.

6. The solid according to claim 1, wherein the phyllosilicate is selected from the group consisting of kaolin, metakaolin, montmorillonite, sepiolite, vermiculite, mica, talc and combinations thereof.

7. The solid according to claim 1, wherein the phyllosilicate is selected from the group consisting of kaolin, metakaolin, talc, montmorillonite, and combinations thereof.

8. The solid according to claim 1, wherein the mean size of the nanometric dimension of the particles is between 20 and 60 nm.

9. The solid according to claim 1, wherein each of the mean the size of the first micro-sized dimension and the mean size of the second micro-sized dimension of the particles is between 200 and 600 nm.

10. The solid according to claim 1, wherein the Cu(0) nanoparticles have a mean size ranging between 1 and 20 nm.

11. The solid according to claim 1, wherein the nanometric dimension is thickness of the particles.

12. The solid according to claim 1, wherein the nanometric dimension is perpendicular to the first and second micro-sized dimensions.

13. The solid according to claim 1, wherein a percentage of particles in the solid having dimensions (ii) and (iii) is at least 90%.

14. A method for manufacturing the solid according to claim 1, comprising: i) delaminating a phyllosilicate; and ii) depositing Cu(0) nanoparticles on the delaminated phyllosilicate, wherein the delaminating comprises suspending the phyllosilicate in an aqueous solution, and adding a surfactant, and wherein the particles have (i) a nanometric dimension; (ii) a first micro-sized dimension; and (iii) a second micro-sized dimension; wherein a mean size of the nanometric dimension is 100 nm or lower; wherein a mean size of the first micro-sized dimension is between 200 and 1000 nm; wherein a mean size of the second micro-sized dimension is between 200 and 1000 nm; and wherein the first micro-sized dimension and the second micro-sized dimension are perpendicular.

15. The method of claim 14, wherein the surfactant is an anionic surfactant.

16. The method of claim 15, wherein the anionic surfactant is a surfactant of formula RQ$^-$, wherein R is an aryl or alkyl group containing more than 6 and less than 36 carbon atoms, and wherein Q is a carboxylate, phosphate, sulfonate, or sulfate group.

17. The method of claim 14, wherein the depositing of the Cu(0) nanoparticles comprises:
- ii-1) adding a precursor of Cu(0) nanoparticles to the delaminated phyllosilicate in the aqueous solution;
- ii-2) optionally converting the deposited precursor to a Cu(I) or Cu(II) oxide;
- ii-3) adding a reducing agent to the aqueous solution; and
- ii-4) reducing the precursor of Cu(0) nanoparticles, or the Cu(I) or Cu(II) oxide, to Cu(0).

18. A method to reduce damages caused by fungi allowing protection of crops in agriculture and/or protection and preservation of plant seeds comprising applying onto the crops or plants seeds a composition comprising the solid according to claim 1.

19. The method according to claim 18, wherein the reduction of damages caused by fungi allows protection and preservation of plant seeds.

20. The method according to claim 14, wherein the reduction of damages caused by fungi allows protection of crops in agriculture.

\* \* \* \* \*